(12) United States Patent
Ine

(10) Patent No.: US 7,254,263 B2
(45) Date of Patent: Aug. 7, 2007

(54) APPARATUS AND METHOD FOR DEFECT DETECTION AND PROGRAM THEREOF

(75) Inventor: Eiichi Ine, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 812 days.

(21) Appl. No.: 10/452,876

(22) Filed: Jun. 2, 2003

(65) Prior Publication Data

US 2003/0223631 A1 Dec. 4, 2003

(30) Foreign Application Priority Data

Jun. 4, 2002 (JP) ............................ P2002-162796

(51) Int. Cl.
*G06K 9/00* (2006.01)
*G04N 7/18* (2006.01)
(52) U.S. Cl. .................... 382/145; 348/126; 700/110
(58) Field of Classification Search ................ None
See application file for complete search history.

(56) References Cited

U.S. PATENT DOCUMENTS 5,119,445 A * 6/1992 Suzuki et al. ............... 382/205

6,246,788 B1 * 6/2001 Pattikonda et al. ......... 382/147

FOREIGN PATENT DOCUMENTS

JP 2001-134770 5/2001

* cited by examiner

*Primary Examiner*—Bhavesh M Mehta
*Assistant Examiner*—Charles Kim
(74) *Attorney, Agent, or Firm*—Ostrolenk, Faber, Gerb & Soffen, LLP

(57) ABSTRACT

A reference mask generating part, inspecting mask generating part, defect detecting part are disposed in a control part of a defect detection apparatus. Based on a captured image of an inspection object substrate (an inspecting image data), the inspecting mask generating part performs a contour smoothing processing of a pad pattern to be inspected, and generates an inspecting mask data by carrying out the logical OR with a reference mask data generated by the reference mask generating part. Based on the inspecting mask data so generated, the inspecting image data is inspected. Further, the defect detecting part performs region join processing of a certain defect previously detected. In the case that micro defects are gathered so as to form a defect, the defect detecting part detects them as a defect, and then generates a defect data. Therefore, a miss of defect on the substrate is suppressed, while the image processing is performed at a high speed.

19 Claims, 20 Drawing Sheets

POSITION ROT 1

POSITION ROT 2

POSITION ROT 3

POSITION ROT 4

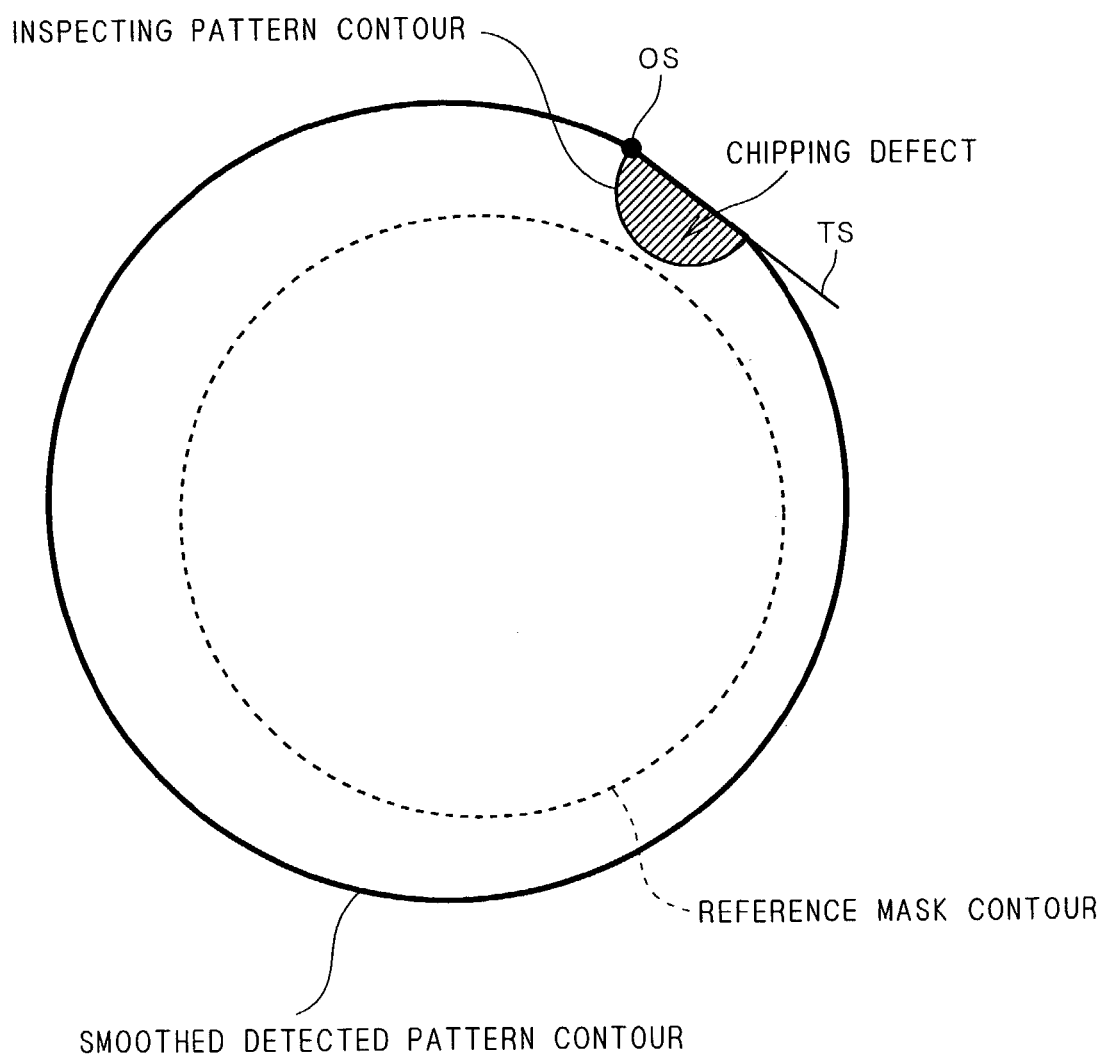
F I G . 1 4

F I G . 1 5 A
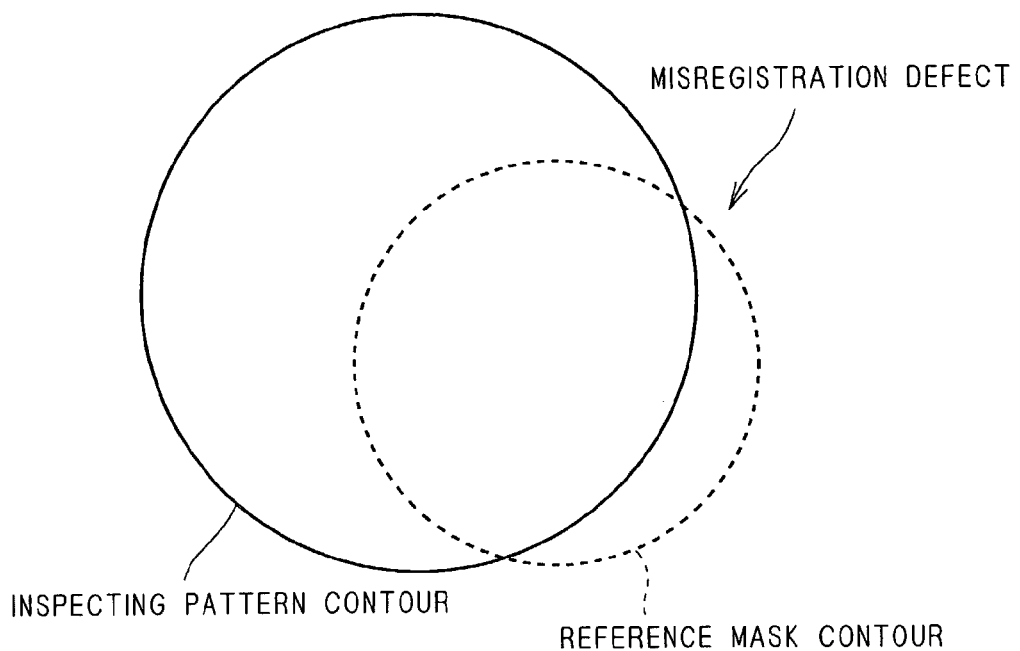
F I G . 1 5 B
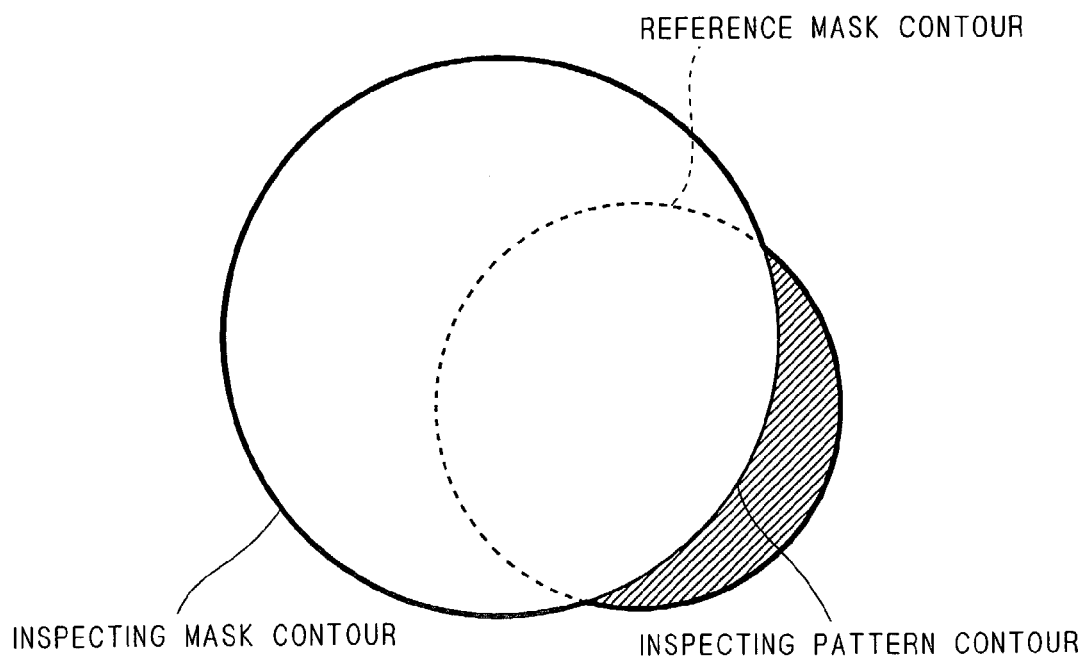

APPARATUS AND METHOD FOR DEFECT DETECTION AND PROGRAM THEREOF

BACKGROUND OF THE INVENTION

1. Field of the Invention

The present invention relates to a technique of detecting a specific object region contained in an image by an image processing.

2. Description of the Background Art

In the manufacturing steps of a substrate such as a printed board, a variety of defects occur on a pad pattern (e.g., a circuit and wiring pattern) formed on a substrate. FIG. 21 shows an example of such defects. There has conventionally been known a technique related to an inspection apparatus for detecting such a pad pattern defect as shown in FIG. 21.

In the inspection apparatus with the above technique, a substrate image is captured, and the captured image is subjected to a predetermined image processing for detecting a defect. The operation of the conventional inspection apparatus and image processing will briefly be described as follows.

Firstly, the pixel value of each pixel in the image of a non-defective substrate selected by an operator's visual check or continuity test is subjected to binarization by a predetermined threshold value, and a reference mask image is then generated.

Subsequently, an inspecting mask image for setting an inspection region on the substrate is generated based on the generated reference mask image and the image of a substrate to be inspected (inspecting image).

Then, while selecting a pixel forming a pad in the inspection region based on the inspecting mask image, it is checked whether the chromatic density of the selected pixel in the inspecting image is in the range of a threshold value. Based on the result, it is judged whether each pixel is a pixel constituting a defect (i.e., a defect pixel), thereby generating a defect image, each pixel of which is represented by a pixel value indicating a defect pixel or not.

Further, based on the defect image, a defect region is sampled which is a region where defect pixels are adjacent to each other and can be regarded as a region forming a single defect. Defect detection is performed by judging whether the defect region is a defect or not based on characteristic features such as the location and size of the defect region.

Thereafter, the operator checks and judges whether the individual defect detected by the inspection apparatus is actually a defect or not.

It should be noted that it is impossible to completely eliminate positioning error etc. in the manufacturing steps of a substrate and even a non-defective substrate can cause any error in the position and size of a pad. When a reference mask image generated from the image of this non-defective substrate having such error is used for defect inspection, a misregistration error (e.g., a portion that is not an actual defect as shown in FIG. 21) is recognized as a defect, causing an erroneous detection of defect in the contour part of the pad.

Therefore, in the inspection apparatus with the above-mentioned technique, it is necessary to narrow (reduce) the area of a mask, and a reference mask is generated by further performing reduction processing of the image obtained by binarization. However, this inspection apparatus suffers from the problem that the reduction processing in generating a reference mask causes a dead zone (a region not subjected to any defect detection), and the sensing rate of defect lowers, resulting in the increased miss of defect.

When the size of a region previously detected as a defect is smaller than a predetermined area (the number of pixels), this region is not regarded as a defect, in order to prevent over detection of the defect due to image non-uniformity etc. Therefore, when defects having an area less than the predetermined area are gathered, these defects may be overlooked, although they should be detected as a single defect, in consideration of the adverse effect upon the product.

Furthermore, in the image processing with the above-mentioned technique, a processing for sampling pixels forming the contour of a specific region (i.e., contour pixels) is performed, for example, to judge in which pad a detected defect region is contained, or find the location of a defect (the centroidal location). In this processing, the contour pixels are sampled by comparisons of the pixel values of all the pixels contained in an image and their respective adjacent pixels. Therefore, this processing requires a large amount of arithmetic operation, thus failing to execute the image processing at high speed.

SUMMARY OF THE INVENTION

The present invention is directed to a technique of detecting a specific object region contained in an image by an image processing.

According to the present invention, a defect detection apparatus includes: (a) an image capturing part for capturing an image of a substrate; (b) a reference mask generating element for generating a reference mask image from an image of a non-defective substrate captured by the image capturing part; (c) an inspecting mask generating element for generating an inspecting mask image based on an image of an inspection object substrate captured by the image capturing part and the reference mask image, the inspecting mask generating element including (c-1) a smoothing element that traces the contour of a pattern formed on the inspection object substrate (an inspecting pattern) by using a first contour sampler made of not less than three pixels, and smoothes the contour of the inspecting pattern based on a tracing trajectory in the contour of the inspecting pattern obtained by the first contour sampler; (d) a candidate region sampling element for sampling a defect candidate region from the image of the inspection object substrate based on the inspecting mask image; and (e) a detecting element for detecting the defect candidate region as a defect of the inspecting pattern based on characteristic features of the defect candidate region.

This enables to detect a defect of an inspecting pattern formed on an inspection object substrate, while preventing a miss of a chipping defect in a dead zone.

Preferably, the reference mask generating element includes a contour sampling element for sampling the contour of the non-defective pattern by tracing the contour of a pattern formed on the non-defective substrate (a non-defective pattern) with the use of a second contour sampler made of not less than two pixels.

This enables to sample the contour of a pattern formed on a non-defective substrate at high speed.

The present invention is also intended for a method of detecting a defect including: an image capturing step of capturing, as an image, an object region on an inspection object substrate; and a contour sampling step of sampling the contour of the object region by tracing the contour of the object region in the image with the use of a contour sampler made of not less than two pixels.

Accordingly, it is a first object of the present invention to provide a technique of suppressing a miss of defect while suppressing an erroneous detection and over detection of defects due to positioning error or image non-uniformity.

It is a second object of the present invention to provide a technique of enabling a high-speed processing when sampling a predetermined region contour from an image by an image processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram to explain the principle that a contour is smoothed;

FIGS. 15A and 15B are diagrams showing the cases where a misregistration defect occurs in an inspecting pattern;

DESCRIPTION OF THE PREFERRED EMBODIMENTS

Figure 1:
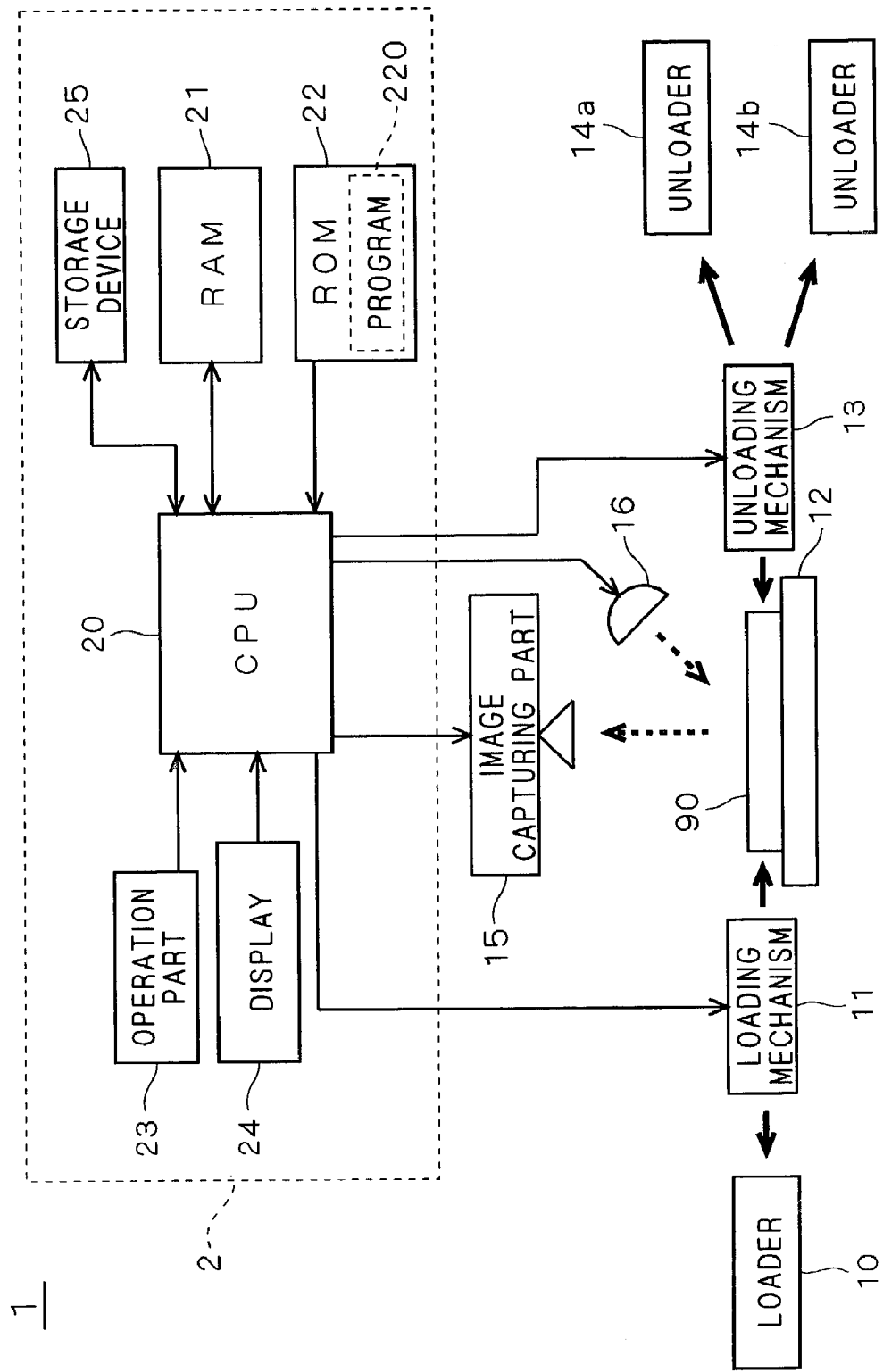
FIG. 1 is a diagram showing a functional configuration of a defect detection apparatus according to a first preferred embodiment of the present invention.

FIG. 1 is a diagram showing a functional configuration of a defect detection apparatus 1 in a first preferred embodiment. The defect detection apparatus 1 comprises a loader 10 into which a substrate 90 is loaded by an operator or a transportation mechanism (not shown); a loading mechanism 11 by which the substrate 90 is taken out of the loader 10 and loaded into an inspection stage 12; the inspection stage 12 holding the substrate 90 at a predetermined location; an unloading mechanism 13 by which the substrate 90 is taken out of the inspection stage 12 and unloaded to an unloader 14a or 14b; the unloaders 14a and 14b with which the operator or transportation mechanism (not shown) takes the substrate 90 out of the defect detection apparatus 1; an image capturing part 15 for capturing an image of the substrate 90 on the inspection stage 12; and a lighting part 16 for lighting when the image capturing part 15 captures an image.

The loading mechanism 11 is, as indicated by the arrows in FIG. 1, configured so as to access the loader 10 and inspection stage 12, respectively, and has the function of transporting the substrate 90 while holding it with a transportation arm (not shown), for example. In an alternative, the loading mechanism 11 may have the function of inverting the substrate 90 on the inspection stage 12. This enables the defect detection apparatus 1 to inspect the both surfaces of the substrate 90.

The inspection stage 12 holds the substrate 90 by a positioning member (not shown), such that it has a predetermined position relationship with the image capturing part 15.

The unloading mechanism 13 is, as indicated by the arrows in FIG. 1, configured so as to access the inspection stage 12 and unloaders 14a and 14b, respectively, and has the function of transporting the substrate 90 while holding it with the transportation arm (not shown), for example. Based on a select signal from a CPU 20, the unloading mechanism 13 transports the substrate 90 on the inspection stage 12 to the unloader 14a or 14b.

By the unloading mechanism 13, a substrate 90 in which any defect has not been detected by inspection is transported to the unloader 14a, and a substrate 90 in which a defect has been detected by inspection is transported to the unloader 14b.

Thus, since the unloading mechanism 13 has a plurality of transportation destinations of the substrate 90, it is possible, for example, to classify the substrate 90 into one in which a defect has been detected by inspection, and one in which no defect has been detected by inspection.

In an alternative, the loading mechanism 11 or unloading mechanism 13 may also serve as the inspection stage 12. For example, it is possible to capture an image by stopping the loading mechanism 11 (or the unloading mechanism 13) at a predetermined position during the transportation of the substrate 90. Alternatively, a loading mechanism 11 (or an unloading mechanism 13) such as a belt conveyer is placed such that the image capturing part 15 performs an image capturing when the substrate 90 arrives at a predetermined position of this loading mechanism 11. That is, it is possible to employ any configuration that can hold the substrate 90 approximately at the set position with respect to the image capturing part 15, during the time of capturing an image of the substrate 90.

The image capturing part 15 has the function of a general digital camera and is disposed at a location opposed to the substrate 90 held on the inspection stage 12. Based on an image capturing instruction signal from the CPU 20, the image capturing part 15 captures an image of a pattern (i.e., a pad pattern), such as a circuit and wiring formed on the substrate 90. At this time, the lighting part 16 provides lighting properly so as to capture a clear image. The image of the pad pattern, i.e., the image so captured, is then transferred as digital data to the CPU 20.

The defect detection apparatus further includes, as a control part 2 for controlling the individual components, the CPU 20 that executes the arithmetic operation of various data and the generation of control signals; a RAM 21 temporally storing data; a ROM (read only memory) 22 storing a program 220; an operation part 23 through which an operator inputs an instruction to the defect detection apparatus 1; a display 24 displaying a variety of data as image; and a storage device 25 storing a variety of data in a magnetic disk etc. The storage device 25 may be a reading device that writes data on a portable recording medium (e.g., magneto-optical disk or memory card) and reads data from it.

Figure 2:
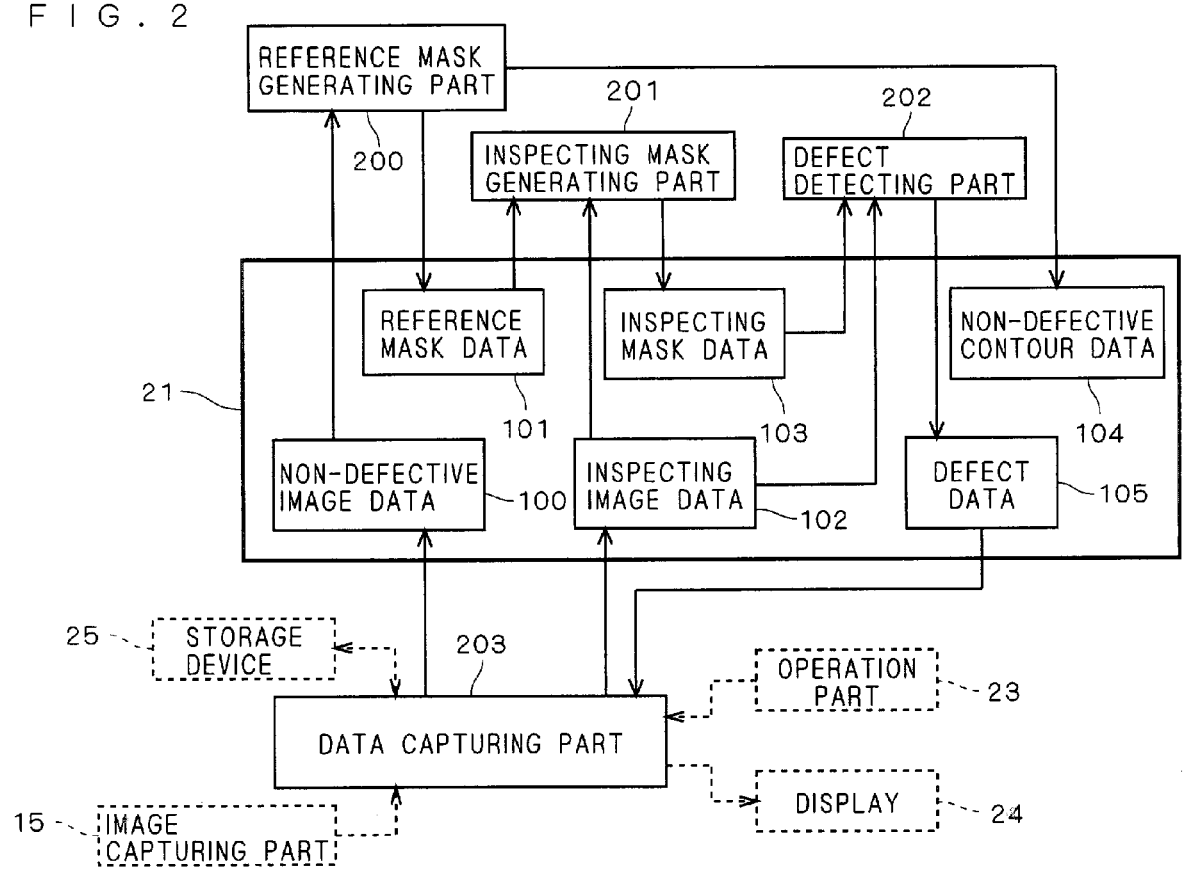
FIG. 2 is a block diagram showing functional configurations, along with data flows, which are implemented by a CPU of the defect detection apparatus.

FIG. 2 shows functional configurations, along with data flows, which are implemented by that the CPU 20 of the defect detection apparatus 1 executes the program stored in the ROM 22. In FIG. 2, a reference mask generating part 200, an inspecting mask generating part 201, a defect detecting part 202, and a data capturing part 203 are functional configurations to be implemented by the CPU 20.

The reference mask generating part 200 generates a reference mask data 101 based on a non-defective image data 100 that is the image of a substrate 90 previously judged as non-defective (hereinafter referred to as a "non-defective substrate 91") to be captured by the image capturing part 15.

Further, the reference mask generating part 200 generates, based on the non-defective image data 100, a non-defective contour data 104 indicating the contour of a pad pattern formed on the non-defective substrate 91 (hereinafter referred to as a "non-defective pattern").

Specifically, the reference mask generating part 200 constitutes mainly a reference mask generating element in the present invention. Details of the reference mask generating method will be described later. The reference mask data 101 is data indicating the indispensable pixel constituting a pad even if the pad on the substrate 90 has a misregistration error in the manufacturing steps.

The inspecting mask generating part 201 generates an inspecting mask data 103 based on an inspecting image data 102 that is the image of a substrate 90 to be captured by the image capturing part 15 as an inspection object (hereinafter referred to as an "inspection object substrate 92"), and the reference mask data 101 generated by the reference mask generating part 200. That is, the inspecting mask generating part 201 constitutes mainly an inspecting mask generating element in the present invention. The inspecting mask data 103 is data indicating a pixel to be inspected in the pixels contained in the inspecting image data 102.

The defect detecting part 202 samples a defect candidate region from the inspecting image data 102 captured by the image capturing part 15, based on the inspecting mask data 103 generated by the inspecting mask generating part 201. Based on the characteristic features of the sampled defect candidate regions such as its location and size, the defect detecting part 202 also judges whether the sampled defect candidate region is defect or not, and then detects, as a defect, the defect candidate region previously judged as a defect. That is, the defect detecting part 202 constitutes mainly a candidate sampling element and detecting element.

In addition, with respect to the individual detected defect, the defect detecting part 202 generates a defect data 105 indicating the identifier, location and size of a pad having this defect.

The data capturing part 203 has the function of processing a variety of data, based on signals inputted by the operator's operation on the operation part 23.

Further, the data capturing part 203 performs data processing and receives data from and sends data to the individual components of the defect detection apparatus 1. For example, it stores the image data captured by the image capturing part 15 in the storage device 25, perform necessary processing to the defect data 105 in order to display it on the display 24, alternatively, performs data transfer between the RAM 21 and storage device 25.

The foregoing is the description of the configuration of the defect detection device 1 in the first preferred embodiment. Following is the operation of the defect detection apparatus 1.

Figure 3:
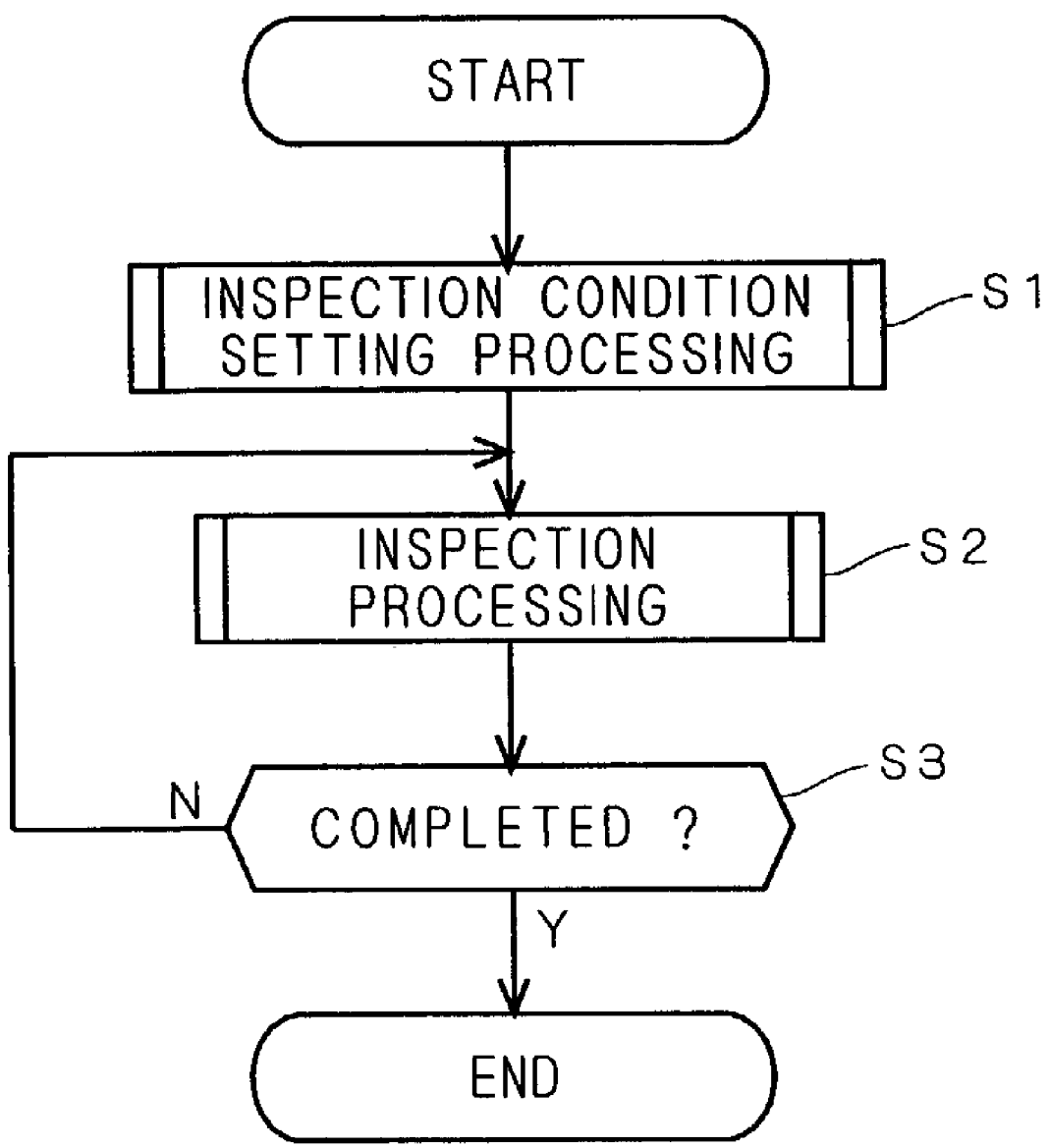
FIG. 3 is a flowchart of the operation of the defect detection apparatus.
Figure 4:
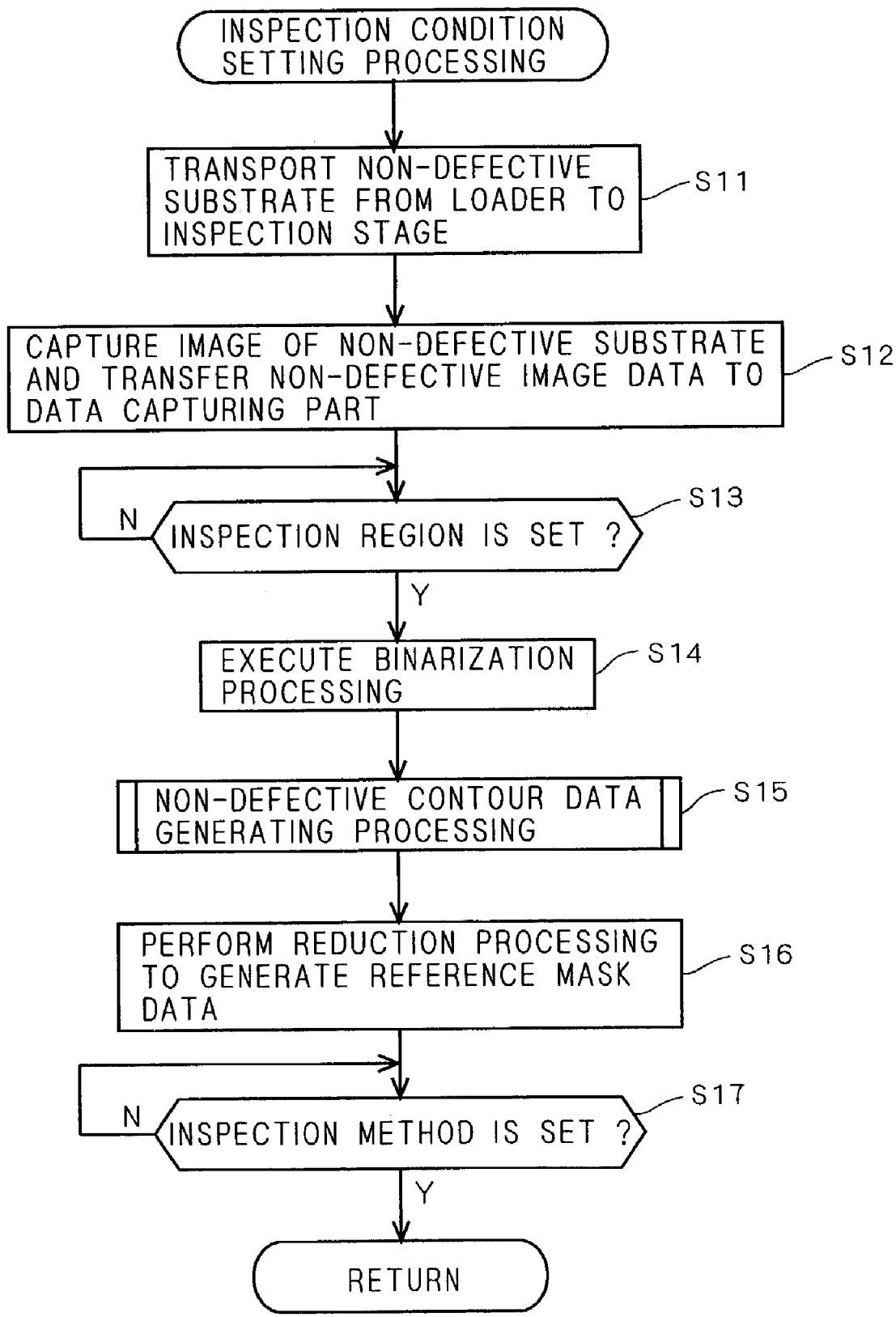
FIG. 4 is a flowchart showing details of inspection condition setting processing.

FIG. 3 is a flowchart showing the operation of the defect detection apparatus 1. In the defect detection apparatus 1, firstly, an inspection condition setting processing is performed (step S1). FIG. 4 is a flowchart showing details of the inspection condition setting processing in step S1.

In the inspection condition setting processing, firstly, the loading mechanism 11 transports the non-defective substrate 91 from the loader 10 to the inspection stage 12 (step S11), and the image capturing part 15 captures an image of the non-defective substrate 91 held by the inspection stage 12, so that a non-defective image data 100 is transferred to the data capturing part 203 (step S12). When the image capturing through the image capturing part 15 completes, the unloading mechanism 13 unloads the non-defective substrate 91 to the unloader 14a, through which the non-defective substrate 91 is unloaded from the defect inspection apparatus 1.

Subsequently, the wait condition continues until the operator sets an inspection region (step S13), and the reference mask generating part 200 generates data by subjecting the non-defective image data 100 to binarization (step S14).

In an alternative configuration, a region to be captured by the image capturing part 15 may be previously set as an inspection region, so as to capture only an image of the inspection region. The binarization processing is one in which the pixel value of each pixel constituting an image data is compared with a predetermined threshold value, and the pixel value of a pixel having the predetermined threshold value or more and the pixel value of a pixel having a value below the predetermined threshold value are set to "1" and "0", respectively. Since a pad pattern is captured as a light region on the substrate 90, the pixel value of pixels constituting this pattern are set to "1", and the region of the substrate 90 except for the pattern is dark and therefore set to "0".

After the binarization processing in step S14, a non-defective contour data generating processing is performed (step S15).

Figure 5:
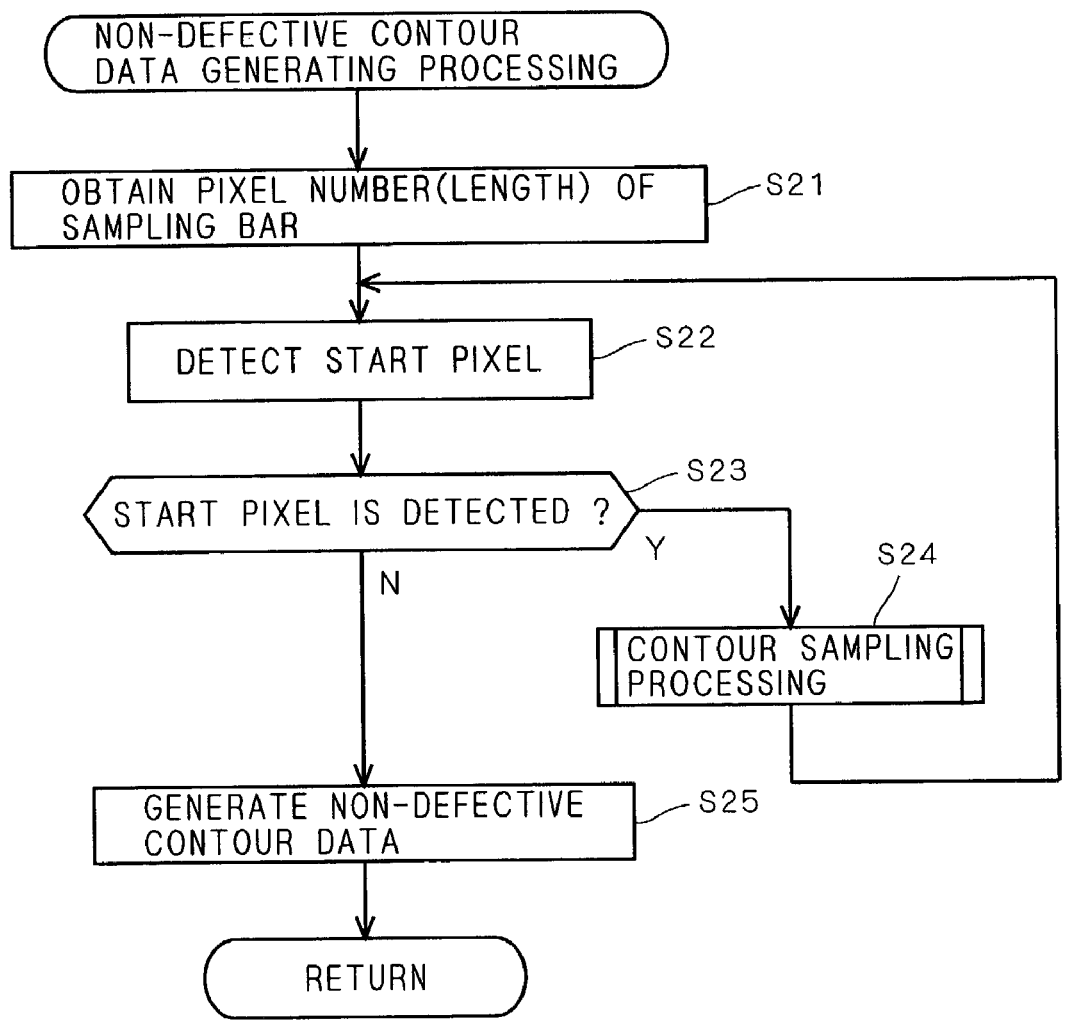
FIG. 5 is a flowchart showing details of non-defective contour data generating processing.
Figure 10:
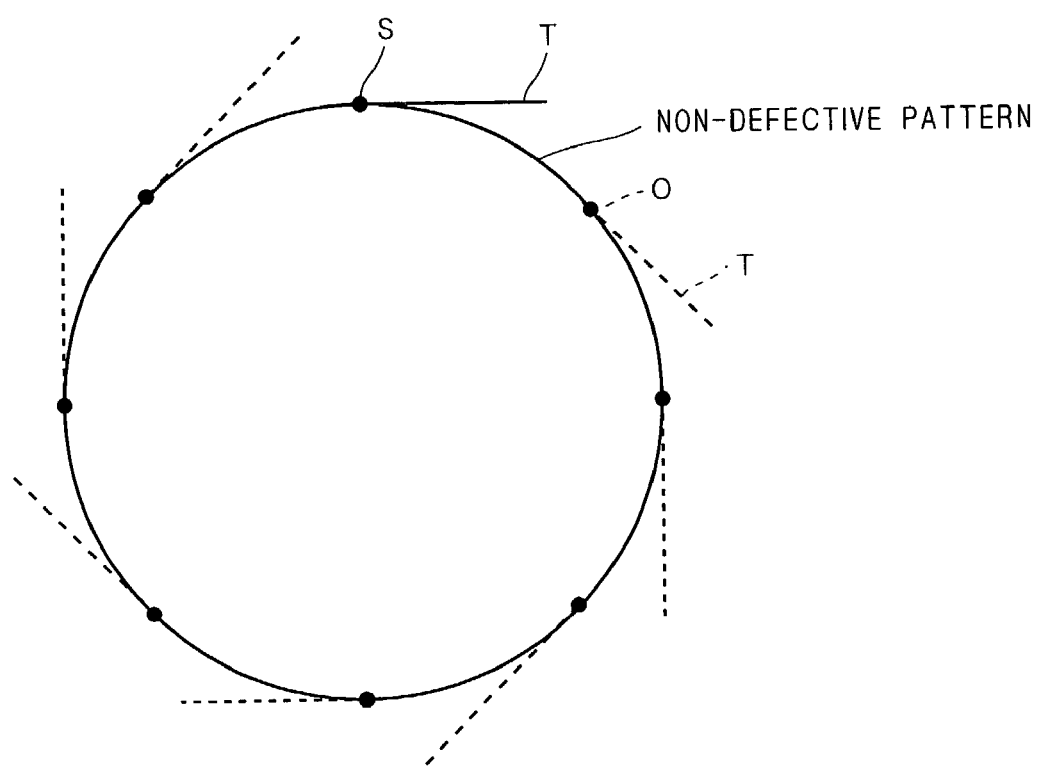
FIG. 10 is a diagram to explain the principle that the defect detection apparatus samples a contour by using the sampling bar.

FIG. 5 is a flowchart showing details of the non-defective contour data generating processing of the defect detection apparatus 1. In this processing, firstly, the reference mask generating part 200 captures a pixel number L of a sampling bar T, corresponding to the length of the sampling bar T (step 21). The sampling bar T is shown in FIG. 10 to be described later and corresponds to a second contour sampler in the present invention.

Subsequently, the reference mask generating part 200 detects a start pixel S (step S22). The start pixel S is a pixel at a position from which the sampling bar T starts a contour pixel sampling. For example, scanning is performed in a predetermined direction from an end pixel in the data obtained by subjecting the non-defective image data 100 to binarization, and the pixel initially detected as a pixel having a pixel value of "1" replaces a start pixel S. In the first preferred embodiment, the pixel number L of the sampling bar T is to be "2".

As will be described in detail later, the sampling bar T is a pixel sequence made of two pixels disposed to be different direction, and it moves so as to trace a chain of contour pixels of a non-defective pattern by rotating around a fulcrum point pixel O set on the sampling bar T and suitably moving the fulcrum point pixel O.

When a start pixel S is detected in step S22 ("Yes" in step S23), the detected start pixel S is stored as a contour pixel of the non-defective pattern, and then a contour sampling processing is executed (step S24).

Figure 6:
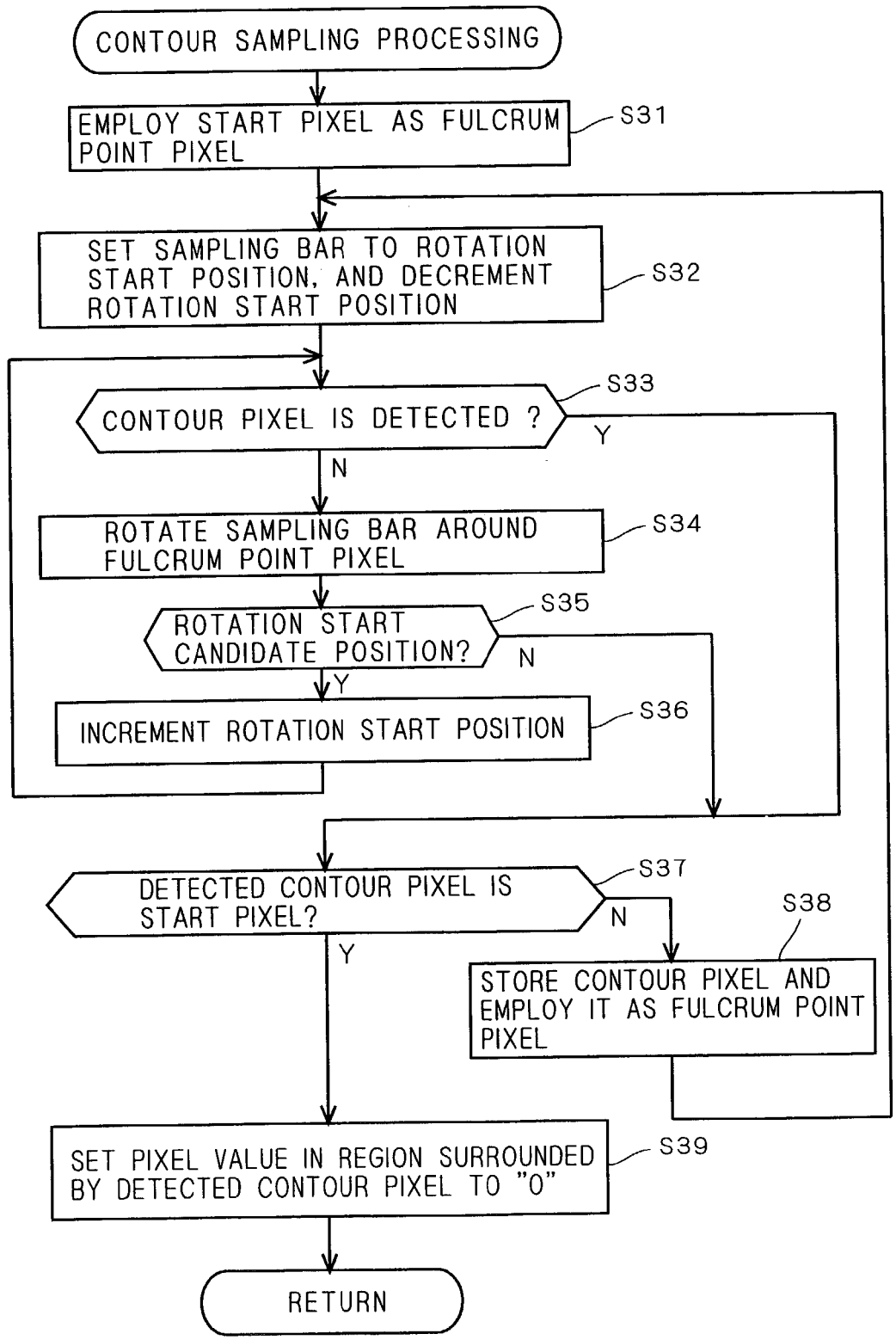
FIG. 6 is a flowchart showing details of contour sampling processing.

FIG. 6 is a flowchart showing details of the contour sampling processing. FIGS. 7A to 7D are diagrams showing rotation start candidate positions of the sampling bar T (positions ROT1 to ROT4), respectively.

In FIGS. 7A to 7D, pixel (X2, Y2) indicated by the black dot is a fulcrum point pixel O that is the rotation center of the sampling bar T. In the first preferred embodiment, the following positions are previously defined:

Position ROT1 (FIG. 7A): a position in a lateral direction where the fulcrum point pixel O is located at the left end;

Position ROT2 (FIG. 7B): a position in a longitudinal direction where the fulcrum point pixel O is located at the upper end;

Position ROT3 (FIG. 7C): a position in a lateral direction where the fulcrum point pixel O is located at the right end; and Position ROT4 (FIG. 7D): a position in a longitudinal direction where the fulcrum point pixel O is located at the lower end, as candidate positions from which the sampling bar T starts rotation for detecting contour pixels (i.e., rotation start candidate positions), and are selectively stored as a rotation start position. Although the rotation start candidate position is defined every 90° of the amount of rotation of the sampling bar T, without limiting to this, it is possible to define every 45° in order to obtain eight rotation start candidate positions. The initial value of the rotation start position is set to position ROT1.

In the contour sampling processing, firstly, the start pixel S detected in step S22 (FIG. 5) is set to the fulcrum point pixel O of the sampling bar T (step S31).

Subsequently, based on the initial value of the rotation start position, the sampling bar T is set to position ROT1, and the rotation start position is decremented (step S32). The rotation start candidate positions are in the order named: position ROT1, position ROT2, position ROT3, position ROT4, position ROT1, . . . . In step S32, the rotation start candidate position before the present rotation start position is newly stored as a rotation start position. In the first preferred embodiment, this processing is referred to as "decrement of rotation start position," and the processing for storing the rotation start candidate position after the present rotation start position as a new rotation start position is referred to as "increment of rotation start position."

Since the initial value of the rotation start position is position ROT1, the rotation start position is decremented in step S32, so that position ROT4 becomes a new rotation start position.

After setting the sampling bar T, it is judged whether a contour pixel is detected or not (step S33). In the processing in step S33, there is obtained the pixel value of other pixel than the fulcrum point pixel O (i.e., a detection object pixel) in the pixels forming the sampling bar T, and in the presence of a pixel having a pixel value of "1", it is judged that this pixel has been detected as a contour pixel. For example, when the sampling bar T is located at position ROT1, as shown in FIG. 7A, the detect object pixel is pixel (X3, Y2).

When it is judged that a contour pixel has been detected ("Yes" in step S33), it is judged whether the detected contour pixel is the start pixel S or not (step S37). When it is not the start pixel S, the pixel value (or the position) of the contour pixel detected in step S33 is stored, and the detected contour pixel replaces the fulcrum point pixel O (step S38), and the processing is repeated from step S32 in order to detect the next contour pixel.

Figure 7A:
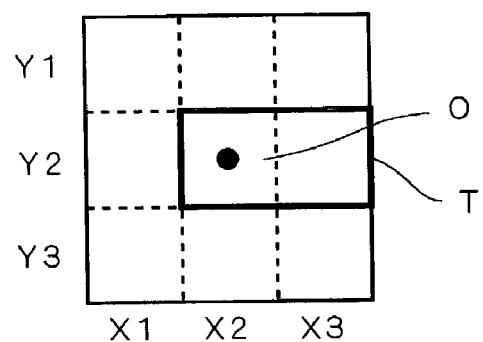
FIGS. 7A to 7D are diagrams showing rotation start candidate positions of a sampling bar, respectively.
Figure 7B:
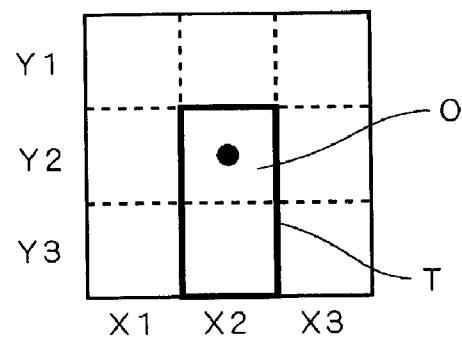
Figure 7C:
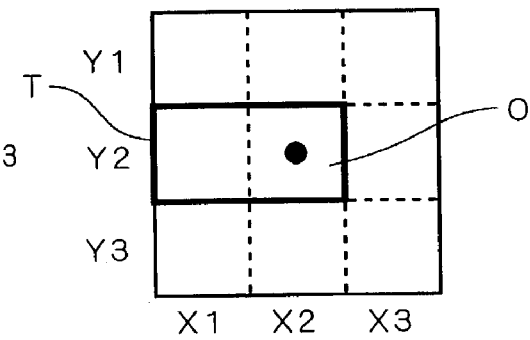
Figure 7D:
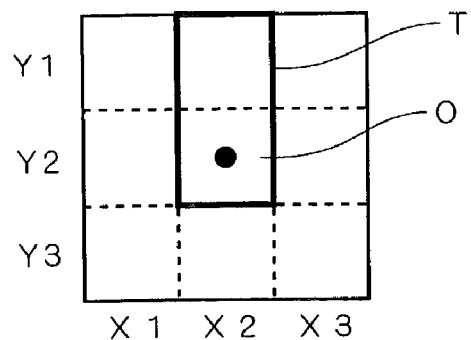

On the other hand, when no contour pixel is detected ("No" in step S33), the sampling bar T is rotated one step in a clockwise direction (step S34), and it is judged whether the after rotation position corresponds to any one of the rotation start candidate positions shown in FIGS. 7A to 7C (step S35). Only when the after rotation position corresponds to one of the rotation start candidate positions, the rotation start position is incremented (step S36). Then, the processing is repeated from step S33.

A description will now be given of a concrete example of the situation that through the foregoing processings, the sampling bar T samples the contour of a non-defective pattern by tracing its contour.

FIGS. 8A to 8C and FIGS. 9A to 9C are diagrams showing the operation of the sampling bar T in the contour sampling processing, wherein a pixel indicated by the black dot is a pixel serving as a fulcrum point pixel O at that point, a pixel indicated by the slant lines is a pixel forming a non-defective pattern (i.e., the pixel having a pixel value of "1"), and a pixel indicated by the half-tone meshing is a pixel sampled as a contour pixel.

Figure 8A:
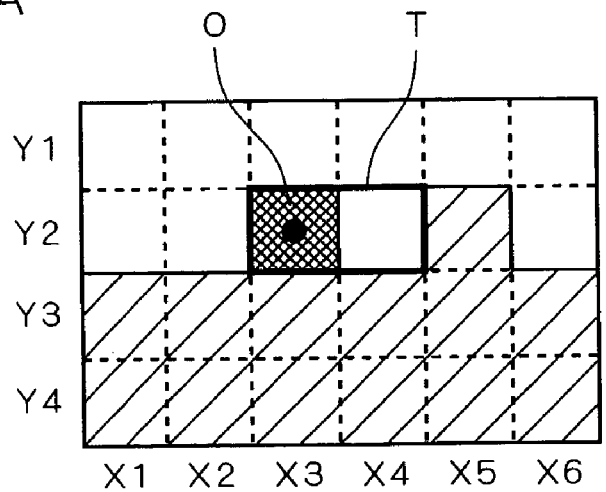
FIGS. 8A to 8C and FIGS. 9A to 9C are diagrams showing the operation of the sampling bar in the contour sampling processing.

FIG. 8A illustrates the state that pixel (X3, Y2) is detected as a start pixel S, this pixel replaces a fulcrum point pixel O, and the sampling bar T is set to a rotation start position having the initial value (i.e., position ROT1). The rotation start position is then decremented to position ROT4. In this state, a detection object pixel (X4, Y3) has a pixel value of "0", and therefore, no contour pixel is detected ("No" in step S33).

Figure 8B:
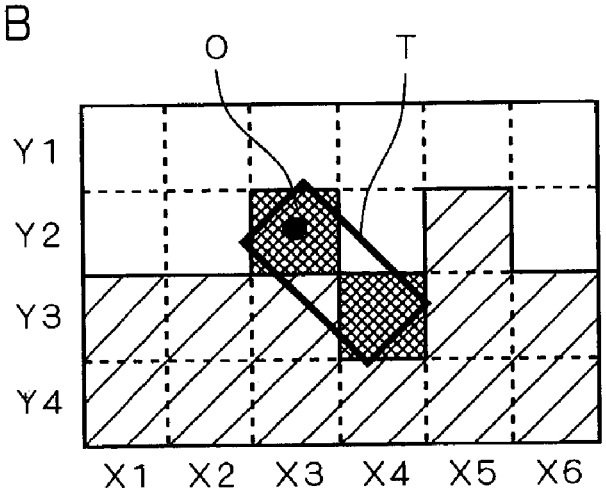

FIG. 8B illustrates the state that the sampling bar T in the state of FIG. 8A is rotated one step in a clockwise direction, that is, the state obtained by executing step S34. In this example, since the position of the sampling bar T does not correspond to any rotation start candidate position, step S36 is not executed (in the case of "No" in step S35, the processing is returned to step S33). However, the detection object pixel (X4, Y3) is detected as a contour pixel because it has a pixel value of "1" ("Yes" in step S33). Further, since the pixel (X4, Y3) is not a start pixel S, the pixel (X4, Y3) is stored as a contour pixel in step S38.

Figure 8C:
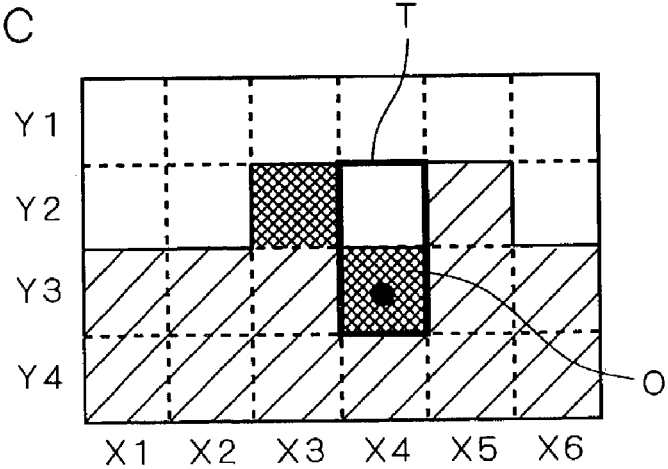

Referring to FIG. 8C, the pixel (X4, Y3) detected as a contour pixel replaces the fulcrum point pixel O, so that the sampling bar T is set to a rotation start position (position ROT4), corresponding to that the sampling bar T is moved in a direction in which the contour of the non-defective pattern extends, and the rotation start position is decremented to position ROT3. Since in this sate the detection object pixel (X4, Y2) has a pixel value of "0", no contour pixel is detected.

Figure 9A:
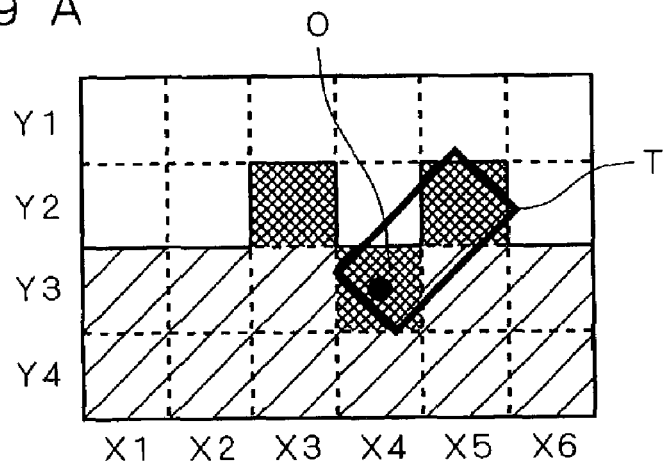

Subsequently, as shown in FIG. 9A, when the sampling bar T is rotated one step, pixel (X5, Y2) is detected as a contour pixel, and the pixel (X5, Y2) is stored as a contour pixel. Further, as shown in FIG. 9B, the pixel (X5, Y2) becomes a fulcrum point pixel O, and the sampling bar T is set to a rotation start position (position ROT3), so that the rotation start position is decremented to position ROT2.

Figure 9B:
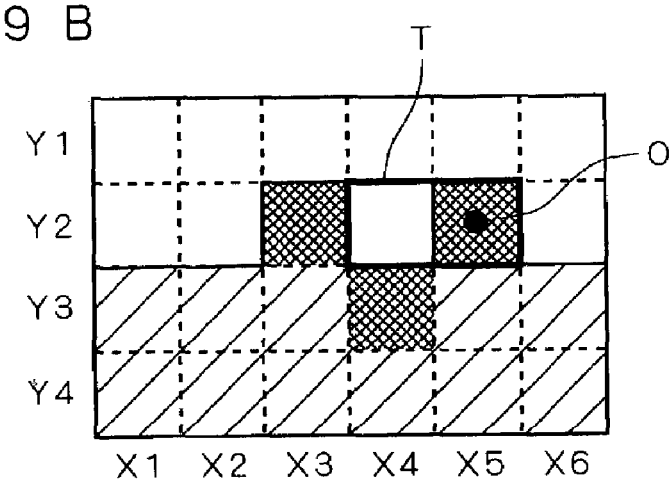
Figure 9C:
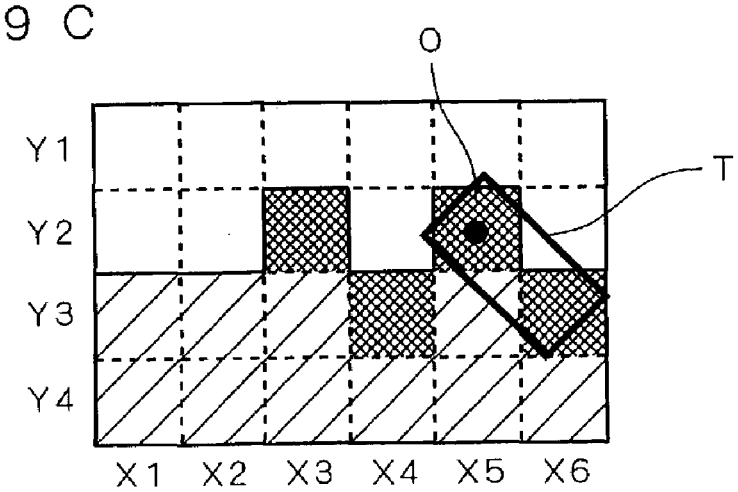

Until a contour pixel is detected as shown in FIG. 9C, the sampling bar T is rotated five steps from the state shown in FIG. 9B. During the time of these rotations, the rotation start position is incremented (i.e., step S36 is executed) when the sampling bar T is located at position ROT4 and position ROT1, respectively. In the state shown in FIG. 9C, the rotation start position, position ROT2, is incremented twice, resulting in position ROT4.

Specifically, in the defect detection apparatus 1 of the first preferred embodiment, the sampling bar T is set to any one of the rotation start candidate positions (positions ROT1 to ROT4) and it rotates on its axis in a clockwise direction, thereby determining the order of detection of contour pixels. For example, when the sampling bar T is set to position ROT1 shown in FIG. 7A, the detection of contour pixel is started from pixel (X3, Y2), followed by pixel (X3, Y3), pixel (X2, Y2), . . . , and pixel (X3, Y1). Every time a contour pixel is detected, this contour pixel replaces a fulcrum point pixel O. After the sampling bar T is returned to the rotation start position, a new contour pixel is detected, and the contour bar T traces the contour of a non-defective pattern, while oscillating thereon.

Returning to FIG. 6, when the detected contour pixel is the start pixel S ("Yes" in step S37), this means that the sampling bar T has traced throughout the contour line of the non-defective pattern. Therefore, the pixel values of pixels within a region surrounded by the contour pixels detected until then are set to "0" (step S39), and the contour sampling processing completes, then returning to the processing shown in FIG. 5. In the first preferred embodiment, if no contour pixel is detected even by giving a full rotation (a rotation of 360°) to the sampling bar T, the pixel value of the start pixel S is set to "0", then returning to the processing shown in FIG. 5.

FIG. 10 is a diagram complementarily illustrating the principle that the defect detection apparatus 1 detects a contour by using the sampling bar T. As shown in FIG. 10, the sampling bar T sequentially oscillates the locations indicated by the dot lines in the contour sampling processing in step S24 shown in FIG. 5

Thus, the processing for rotating the sampling bar T by using the individual contour pixels as a fulcrum point pixel O is to detect a direction in which the next pixel is present on the contour line. The reason why a similar processing is repeated after moving the sampling bar T so as to return the rotation position of the sampling bar T by using the next contour pixel in the detected direction as a fulcrum point pixel O is that the contour line of a non-defective pattern is sequentially traced by the oscillation of the sampling bar T, and the contour line of the non-defective pattern is specified as a closed loop, according to the tracing trajectory of the sampling bar T that has made one revolution of the contour.

Specifically, by oscillating the sampling bar T composed of at least two pixels, it is possible to trace the contour of a non-defective pattern and sample the contour of a region of which contour is to be sampled (e.g., a non-defective pattern). This permits a higher processing speed for contour sampling than the conventional contour sampling performed by comparisons of the pixel values of all the pixels constituting an image with those of their respective adjacent pixels.

Returning to FIG. 5, when the contour sampling processing of a non-defective pattern using a start pixel S as a contour pixel completes (step S24), scanning is resumed in a predetermined direction from the pixel next to the start pixel S, and the contour sampling processing (step S24) is repeated until no new start pixel S is detected (step S23).

When no new start pixel S is detected, the reference mask generating part 200 generates a non-defective contour data 104 based on the contour pixel data stored in step S38 (step S25), and the non-defective contour data generating processing completes, then returning to the processing shown in FIG. 4.

Returning to FIG. 4, when the non-defective contour data generating processing in step S15 completes, the reference mask generating part 200 generates a reference mask data 101 in the following manner that the data obtained by the binarization of the non-defective image data 100 is further subjected to a two-dimensional reduction processing in the range of the non-defective pattern (step S16). The reduction processing is performed by, for example, in the manner that the pixel value of a pixel around which there is a pixel having a pixel value of "0" is set to "0". It is of course possible to employ other manner.

The wait condition continues until the operator sets an inspection method (step S17). After setting an inspection method, the inspection condition setting processing completes, then returning to the processing shown in FIG. 3.

As a general inspection method, there are for example one in which a defect is detected based on the chromatic density of a pixel, and one in which a defect is detected by measuring the dimension of a pattern. In the first preferred embodiment, only the case employing the former method will be described. Since the image of the substrate 90 captured by the image capturing part 15 of the defect detection apparatus 1 is monochrome image, the pixel value of each pixel in the captured image is directly used as a chromatic density, and the chromatic density is merely a value indicating the density of the pixel. Alternatively, in the case that image capturing part 15 captures a color image, the chromatic density may be determined based on the sum of pixel values to be obtained per RGB of each pixel. Meanwhile, the inspection region, inspection method and various data set in the inspection condition setting processing are stored, as inspection conditions, in the storage device 25 by the data capturing part 203, and read into the RAM 21, as required.

Returning to FIG. 3, when the inspection condition setting processing in step S1 completes, the defect detection apparatus 1 performs an inspection processing (step S2).

Figure 11:
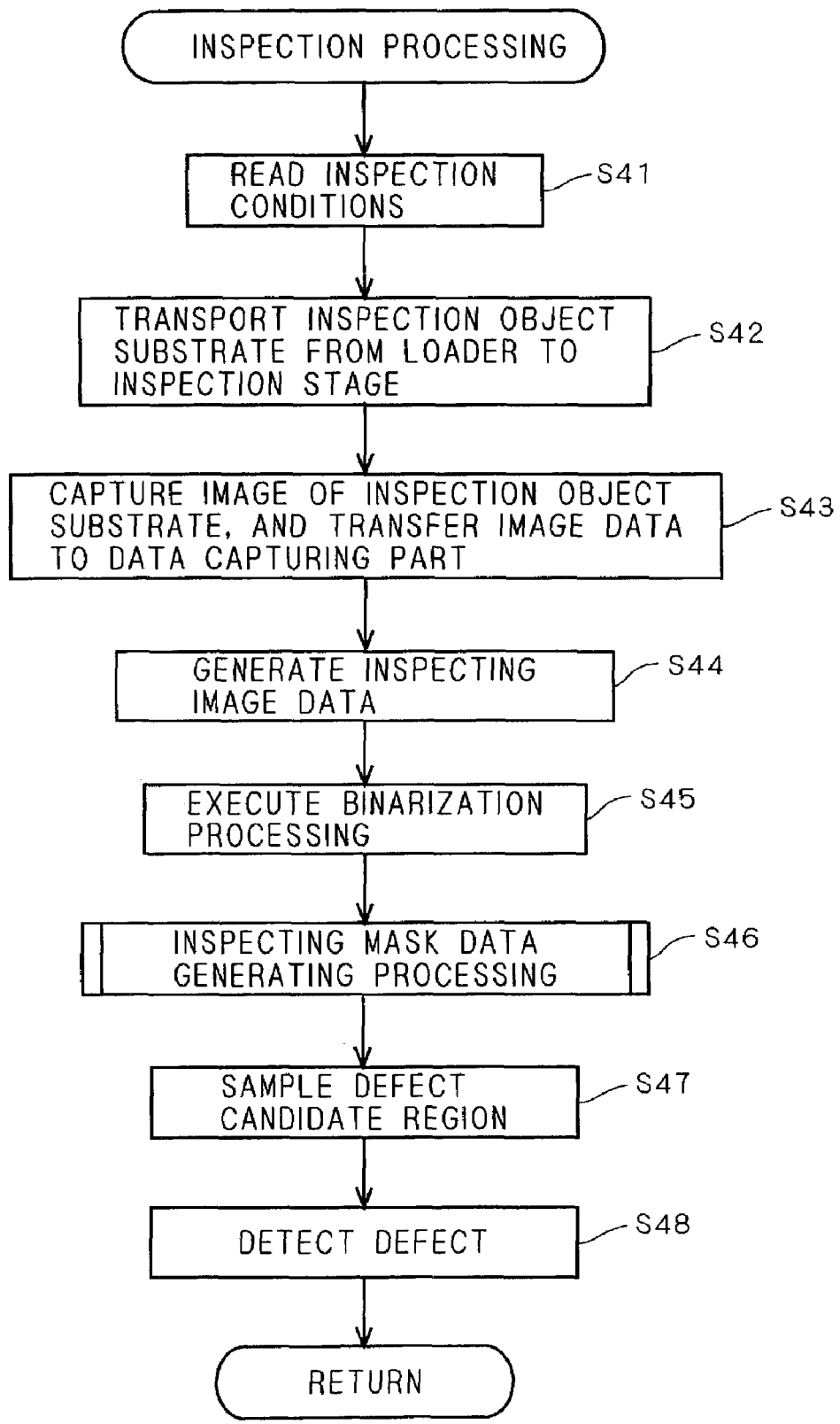
FIG. 11 is a flowchart showing details of inspection processing in the defect detection apparatus.

FIG. 11 is a flowchart showing details of the inspection processing in the defect detection apparatus 1. In the inspection processing, firstly, the data capturing part 203 reads the inspection conditions stored in the storage device 25 into the RAM 21 (step S41), and the loading mechanism 11 transports the inspection object substrate 92 from the loader 10 to the inspection stage 12 (step S42).

Subsequently, the image capturing part 15 captures an image of the inspection object substrate 92 and transfers its image data to the data capturing part 203 (step S43). The data capturing part 203 generates an inspecting image data 102 based on the inspection region indicated on the inspection conditions (step S44).

When the generation of the inspecting image data 102 completes, the inspecting mask generating part 201 subjects the inspecting image data 102 to binarization to obtain data (step S45), and performs an inspecting mask generating processing based on this data and the reference mask data 101 generated by the reference mask generating part 200 (step S46).

Figure 12:
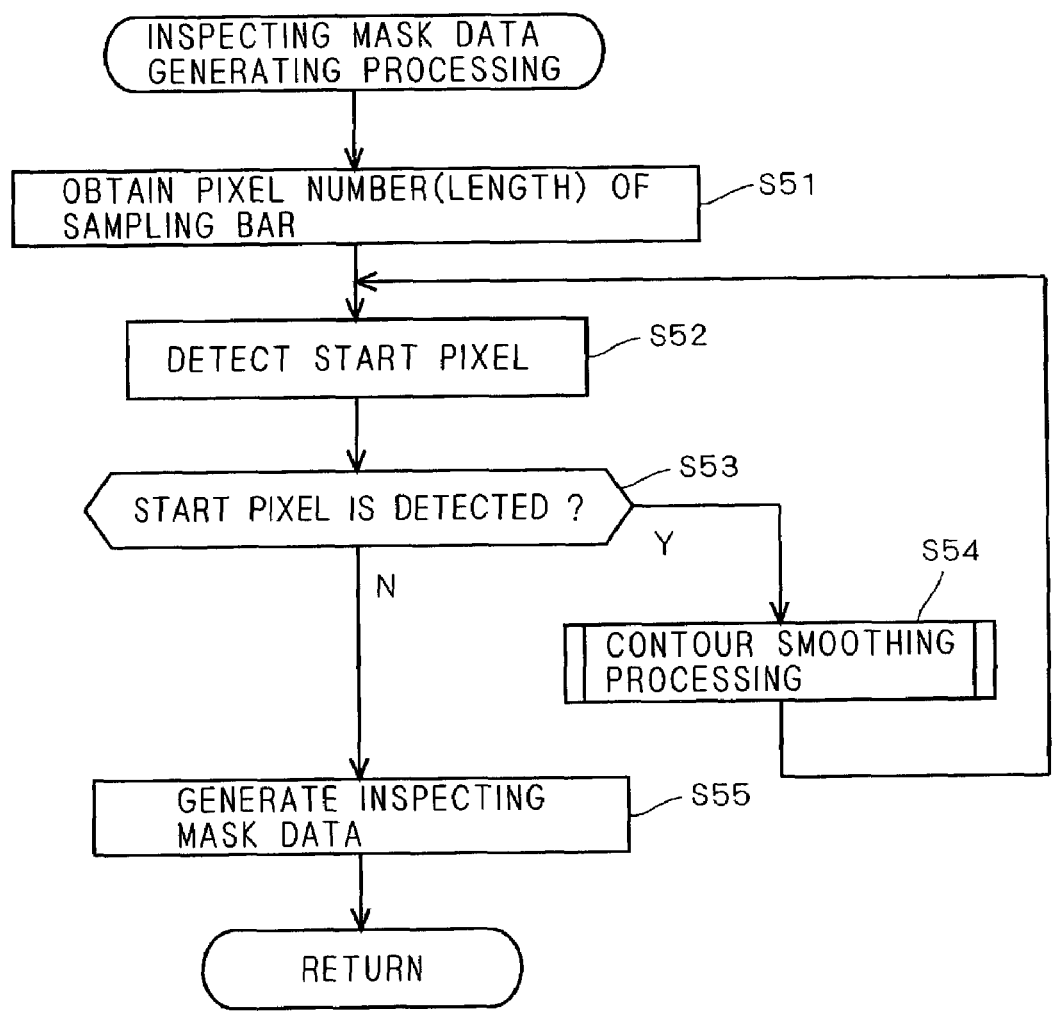
FIG. 12 is a flowchart showing details of inspecting mask generating processing.

FIG. 12 is a flowchart showing details of the inspecting mask generating processing. In this processing, there is firstly obtained a pixel number LS of a sampling bar TS (corresponding to the first contour sampler in the present invention) to be illustrated later in FIG. 14 (step S51), and a start pixel SS is then detected (step S52). The pixel number LS in the first preferred embodiment is to be "5".

Subsequently, it is judged whether the start pixel SS is detected or not (step S53). When it is detected, a contour smoothing processing is performed (step S54).

Figure 13:
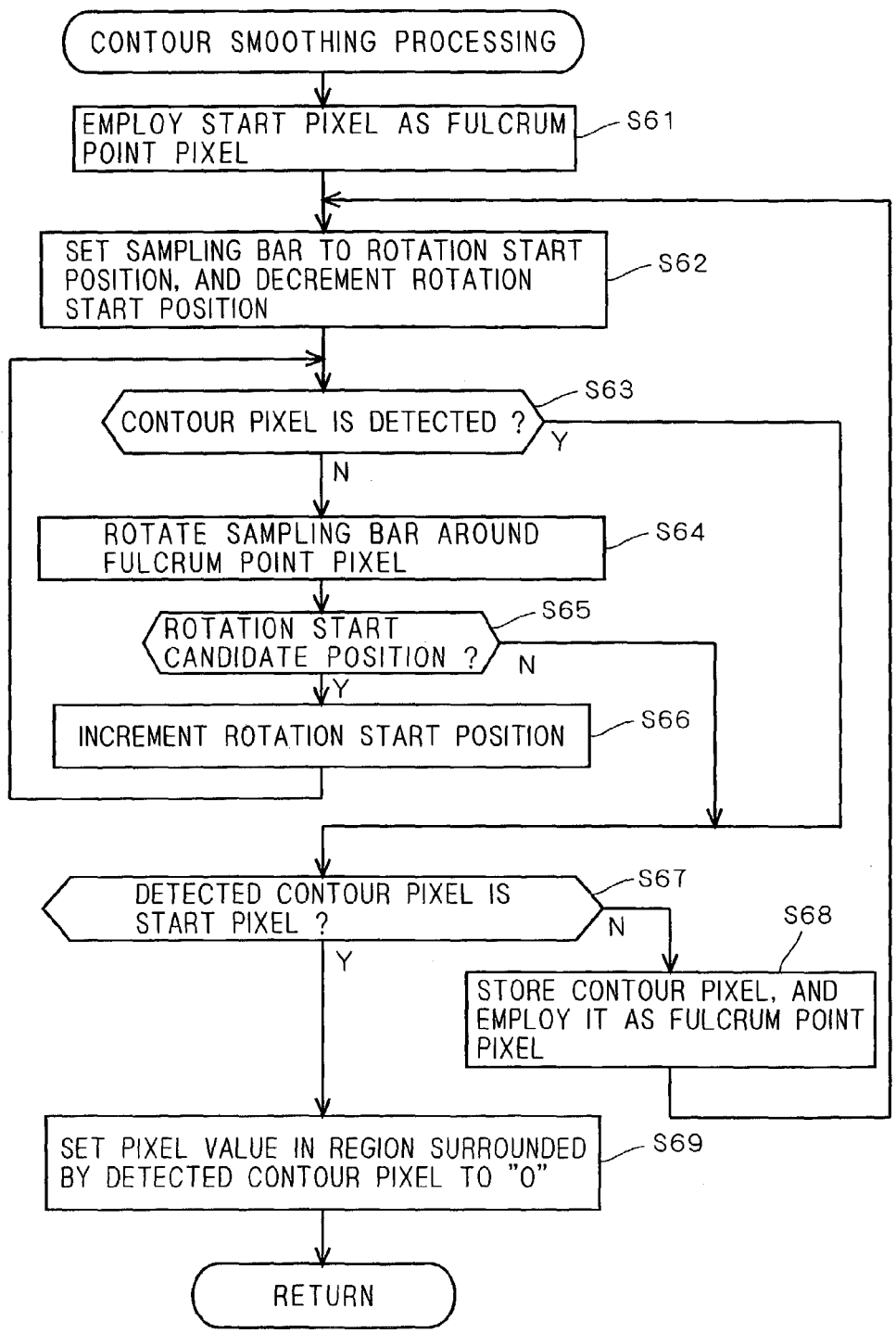
FIG. 13 is a flowchart showing details of contour smoothing processing.

FIG. 13 is a flowchart showing details of the contour smoothing processing, in which approximately the same processing as in the contour detection processing shown in FIG. 6 is performed.

In the contour smoothing processing, firstly, the start pixel SS detected in step S52 (FIG. 12) is defined as a fulcrum point pixel OS (step S61). The sampling bar TS is set to position ROT1 based on the initial value of a rotation start position, and the rotation start position is then decremented (step S62).

After setting the sampling bar TS, it is judged whether a contour pixel is detected or not (step S63). When the judgment result is that the contour pixel has been detected, it is further judged whether the detected contour pixel is a start pixel SS or not (step S67). When the detected contour pixel is not the start pixel SS, a pixel existing between the fulcrum point pixel OS and the contour pixel detected in step S63 is stored as a contour pixel, and the detected contour pixel replaces the fulcrum point pixel OS (step S68). In order to detect the next contour pixel, the processing is repeated from step S62.

When no contour pixel is detected ("No" in step S63), the sampling bar TS is rotated one step in a clockwise direction (step S64), and it is judged whether the after rotation position corresponds to any one of the rotation start candidate positions (step S65). Only when the after rotation position corresponds to one of the rotation start candidate positions, the rotation start position is incremented (step S66). Then, the processing is repeated from step S63.

Like the case of the contour sampling of a non-defective pattern shown in FIG. 6, in the contour smoothing processing, to rotate the sampling bar TS by using the individual contour pixels as a fulcrum point pixel OS is to detect a direction in which the next pixel is present on the contour line. Similarly, the reason why a similar processing is repeated after moving the sampling bar TS so as to return the rotation position of the sampling bar TS by using the next contour pixel in the detected direction as a fulcrum point pixel OS is that the contour line of an inspecting pattern is sequentially traced by the oscillation of the sampling bar TS and the smoothing processing is performed along the contour line of the inspecting pattern, based on the tracing trajectory of the sampling bar TS that has made one revolution of the contour.

When the detected contour pixel is a start pixel SS ("Yes" in step S67), this means that the sampling bar TS has traced throughout the contour line of the inspecting pattern. Therefore, the pixel values of pixels within a region surrounded by the contour pixels detected until then are set to "0" (step S69), and the contour sampling processing completes, then returning to the processing shown in FIG. 12. If no contour pixel is detected even by giving a full rotation (a rotation of 360°) to the sampling bar TS, although not shown in FIG. 13, the pixel value of the start pixel SS is set to "0", then returning to the processing shown in FIG. 12.

Returning to FIG. 12, when the contour smoothing processing using the start pixel SS as a contour pixel completes (step S54), scanning is resumed in a predetermined direction from the pixel next to the start pixel SS, and the contour smoothing processing (step S54) is repeated until no new start pixel S is detected (step S53).

FIG. 14 is a diagram to explain the principle of the contour smoothing processing. As shown in FIG. 14, when an inspecting pattern has a chipping defect (a region indicated by the slant lines), even if an inspecting mask is generated by carrying out the logical OR between the inspecting pattern and a reference mask that has a narrower region than the inspecting pattern due to the reduction processing, the contour of an inspecting mask is the same as the contour of the inspecting pattern.

Here, the inspecting mask is one that determines a pixel to which a chromatic density inspection is performed (the chromatic density inspection is conducted only to a pixel having a pixel value of "1" in the inspecting mask). Therefore, when an inspection is made with this inspecting mask, no inspection is conducted to a pixel locating at a chipping defect part because this part becomes a dead zone. With the conventional technique, it is therefore impossible to detect the chipping defect shown in FIG. 14, as a defect, resulting in a miss of defect.

Whereas in the defect detection apparatus 1 of the first preferred embodiment, as shown in FIG. 14, by tracing an inspecting pattern with the sampling bar TS that is a pixel sequence made of five pixels disposed to be different direction, it is possible to jump over on the contour the chipping defect present in the inspecting pattern and smooth the contour of the inspecting pattern. That is, the contour of a region such as an inspecting pattern can be smoothed by suitably setting the pixel number LS of the sampling bar TS.

In the case that an inspecting mask is generated by carrying out the logical OR between a reference mask and the region surrounded by the contour of the inspecting pattern so smoothed in a processing to be described later, the generated inspecting mask corresponds to a region surrounded by the contour indicated by the bold line in FIG. 14.

If this inspecting mask is used to perform the chromatic density inspection to the individual pixels of an inspecting pattern, pixels locating at a chipping defect part are also inspected. When a pixel has a chromatic density not more than a threshold value, this pixel is detected as a defect in a processing to be described later.

That is, in the defect inspection apparatus 1, the contour smoothing processing to the inspecting pattern formed on the inspection object substrate 92 is performed based on the inspection image data 102, and an inspecting mask data 103 is generated by carrying out the logical OR between a reference mask data 101 and an inspecting pattern of which contour has been smoothed. It is therefore possible to detect a chipping defect occurred at a contour part of the inspecting pattern.

Although in the first preferred embodiment the pixel number LS of the sampling bar TS is "5", without limiting to this, the pixel number may be any number not less than "3", depending on the size of a chipping defect to be detected as a defect. The reason why the pixel number LS is not less than "3" is to make the sampling bar TS have a bridge function of jumping over a chipping defect. In addition, even if a misregistration error occurs in a pad, any non-uniformity does not occur in the contour of an inspecting pattern. It is therefore possible to obtain approximately the same inspecting pattern contour as the inspecting pattern contour to which no smoothing processing is performed. This suppresses an increase in erroneous detection due to the smoothing processing.

It is a conventional technique to generate an inspecting mask by carrying out the logical OR between an inspecting pattern and reference mask pattern. The reason for employing this technique is that it is difficult to detect a misregistration error with the use of an inspecting mask generated only from an inspecting pattern.

FIGS. 15A and 15B are diagrams showing the case that a misregistration defect occurs in an inspecting pattern. Although a reference mask shown in FIGS. 15A and 15B is previously subjected to reduction processing (see FIG. 4, step S17) so as to allow for a micro misregistration, other misregistration is present here even when comparing with this reference mask. Therefore, this case should be detected as a defect because the reference mask is, as previously described, one that indicates an indispensable region where a pad pattern should be formed.

However, in the inspection using an inspecting mask, which is formed by using only an inspecting pattern (i.e., an inspecting mask taking only pixels forming an inspecting pattern as an inspection object), this inspecting pattern might be judged as normal because it has no geometric defect (e.g., a chipping defect). With the use of this inspecting mask, it is impossible to detect the misregistration of the inspecting pattern itself as a defect.

On the other hand, with the use of such an inspecting mask as shown in FIG. 15B that is obtained by carrying out the logical OR between the reference mask and inspecting pattern, the pixels locating in the region indicated by the slant lines is also subjected to a processing to be described later. When the pixel value of a pixel in this region is less than a threshold value, this pixel is detected as a defect, so that any misregistration defect is detectable without missing it.

Returning to FIG. 12, when no new start pixel SS is detected ("No" in step S53), the inspecting mask generating part 201 sets the pixel value of pixels in a region surrounded by the contour pixel stored in step S68 (as previously described, the contour of an inspecting pattern is sampled as a smoothed contour) and the pixel value of pixels locating outside of this region to "1" and "0", respectively. Then, the inspecting mask generating part 201 carries out the logical OR with the reference mask data 101 to generate an inspecting mask data 103 (step S55), and completes the inspecting mask data generating processing, then returning to the processing shown in FIG. 11.

Returning to FIG. 11, when the inspecting mask data generating processing in step S46 completes, the defect detecting part 202 samples a region having a high possibility of defect (a defect candidate region) based on the inspecting mask data 103 and inspecting image data 102 (step S47).

Concretely, the defect detecting part 202 obtains a pixel value of a pixel in the inspecting image data 102, which has a pixel value of "1" in the inspecting mask data 103. When this pixel value is not less than a predetermined threshold value U, this pixel value is regarded as a light region (a pad region). On the other hand, when this pixel value is less than the predetermined threshold value U, the defect detecting part 202 regards it as a dark region (a defect region where no pad is formed), and samples this pixel as a pixel constituting a defect candidate region.

Further, based on the characteristic features of the sampled defect candidate region, the defect detecting part 202 judges whether this defect candidate region is actually a defect or not, and detects as a defect only the defect candidate region judged as a defect (step S48).

Concretely, first, the contour of the defect candidate region is sampled by subjecting the sampled defect candidate region to the contour sampling processing shown in FIG. 6. Prior to the contour sampling processing, the pixel value of the defect candidate region and the pixel value of other region are previously changed to "1" and "0", respectively, and then inverted.

Subsequently, the pixel number of the region surrounded by the contour of the sampled defect candidate regions is found to obtain the size of the individual defect candidate region, and one that has a size larger than a predetermined threshold value V is sampled as a defect.

Further, based on the non-defective contour data 104, the individual pattern defect candidate regions are classified by the type of the inspecting pattern in which they are contained, and the number of defect candidate regions contained in the same inspecting pattern is counted. The inspecting pattern having defect candidate regions of not less than a predetermined number N is regarded as a defect pattern, and all the defect candidate regions contained in this inspecting pattern are sampled as a defect. Alternatively, when the pixel number of a defect candidate region contained in the same inspecting pattern is not less than a predetermined value W, this inspecting pattern may be regarded as a defect pattern.

The above-mentioned predetermined threshold value V, predetermined number N and predetermined value W are values that are previously set as inspection conditions, based on the number and area of defects allowable per pattern.

Figure 16:
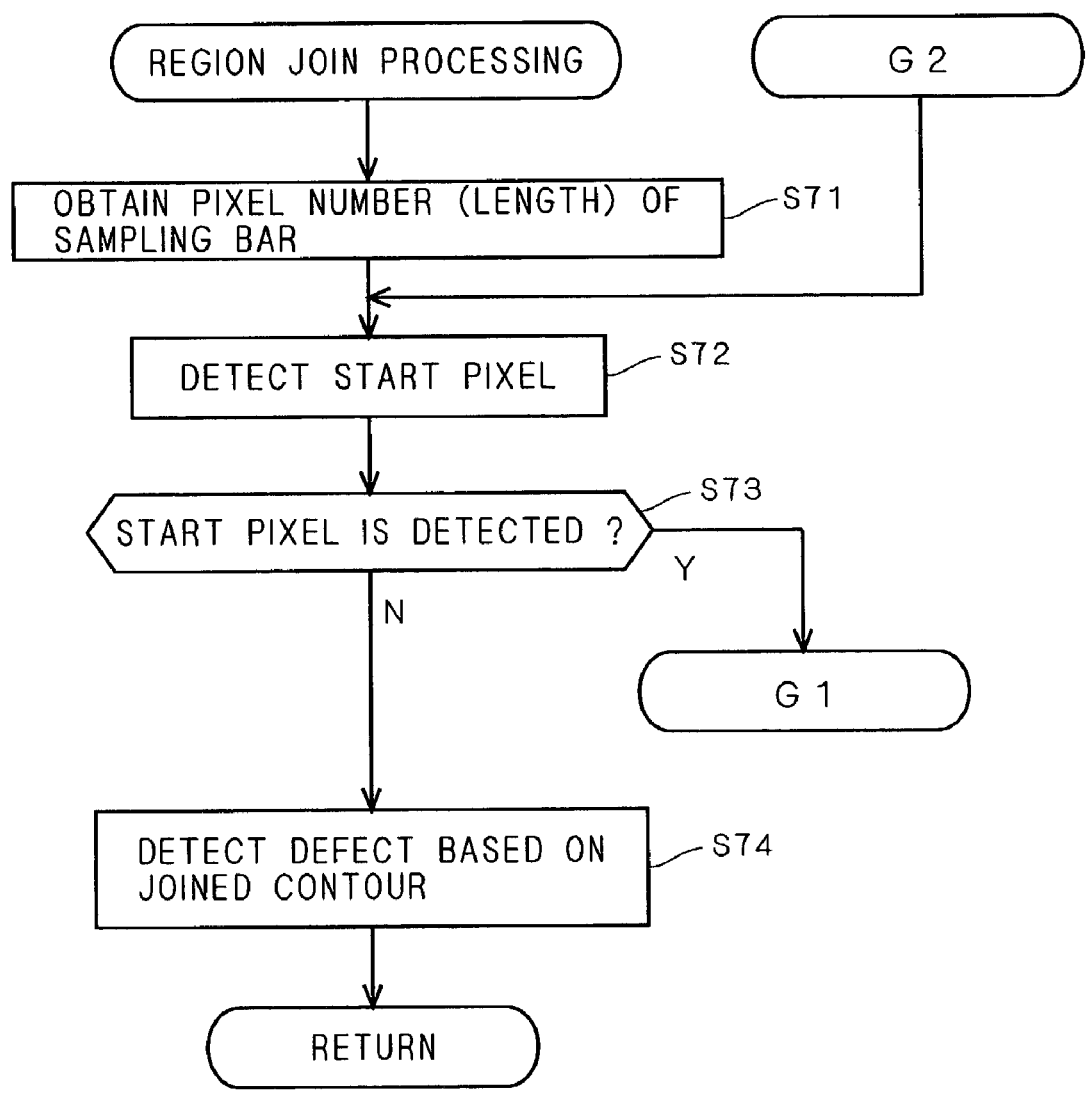
FIGS. 16 and 17 are flowcharts showing details of region join processing to be executed when a defect detecting part detects a defect.
Figure 17:
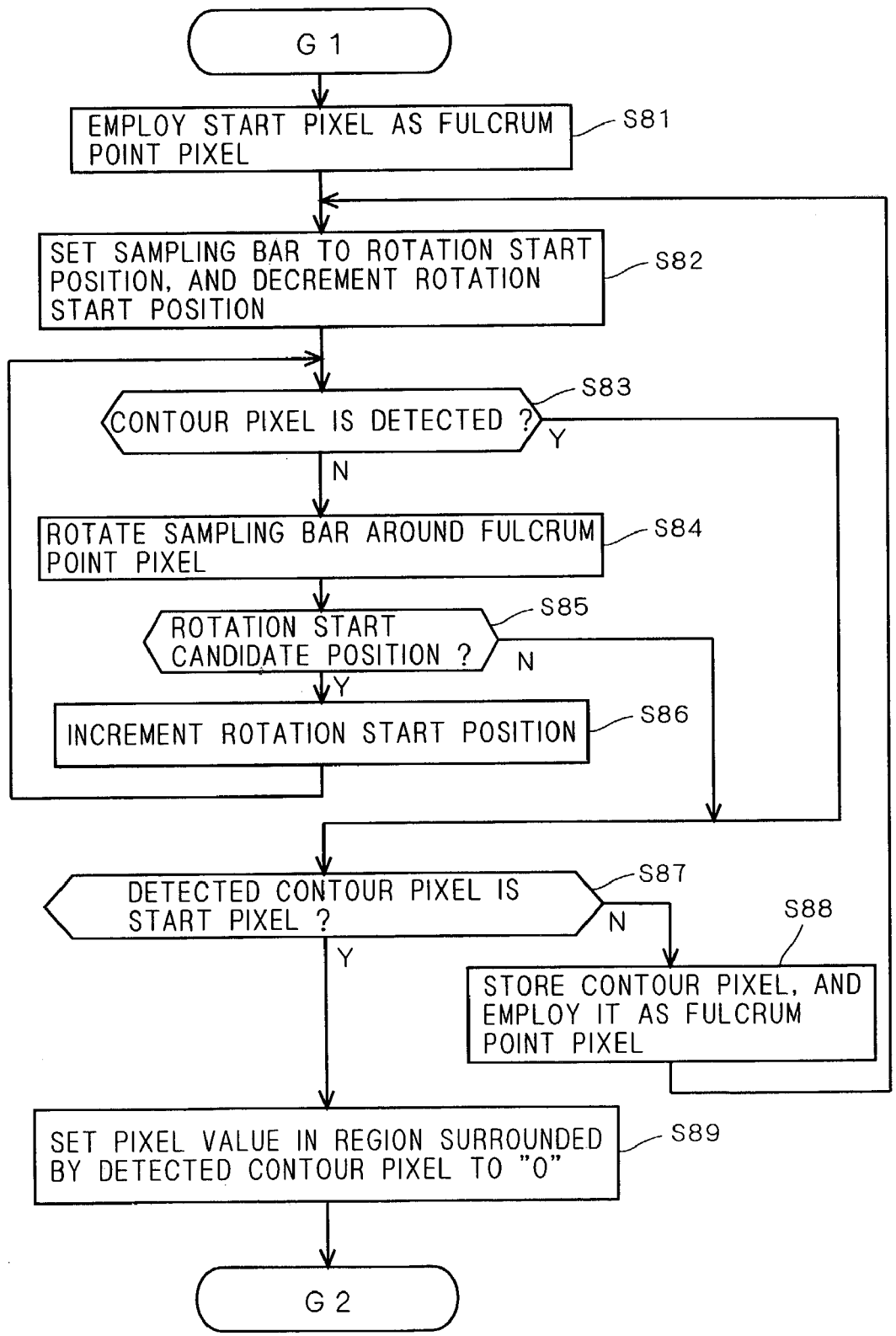

Furthermore, in order to detect the case where defect candidate regions are gathered, a region join processing is performed. FIGS. 16 and 17 are flowcharts showing details of the region join processing when the defect detecting part 202 executes defect detection.

Figure 18A:
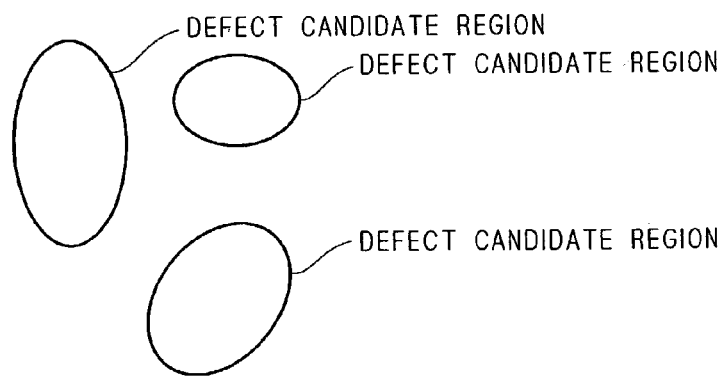
FIGS. 18A and 18B are diagrams to explain the principle that regions are joined.
Figure 18B:
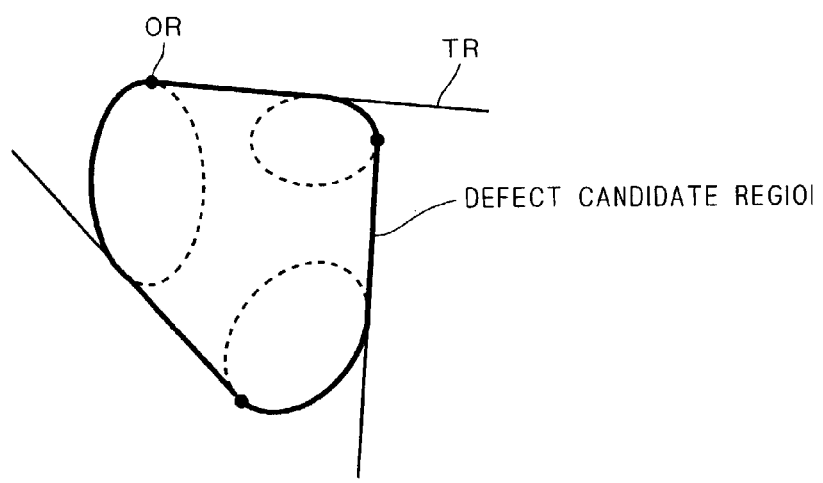

In the region join processing, firstly, a pixel number LR of a sampling bar TR, which is shown in FIG. 18B to be described later and corresponds to a third contour sampler in the present invention, is captured (step S71), and a start pixel SR is detected (step S72). Then, it is judged whether the start pixel SR is detected or not (step S73). Although the pixel number LR is a predetermined value of "3" or more, the pixel number LR is to be "10" in the first preferred embodiment.

When a start pixel SR is detected ("Yes" in step S73), the detected start pixel SR replaces a fulcrum point pixel OR of the sampling bar TR (step S81). The sampling bar TR is then set to position ROT1 based on the initial value of the rotation start position, and the rotation start position is then decremented (step S82).

After setting the sampling bar TR, it is judged whether a contour pixel is detected or not (step S83). When the judgment result is that the contour pixel has been detected, it is further judged whether the detected contour pixel is a start pixel SR or not (step S87). When the detected contour pixel is not the start pixel SR, all the pixels between the detected contour pixel and fulcrum point pixel OR are stored as a contour pixel, and the detected contour pixel replaces the fulcrum point pixel OR (step S88). Returning to the processing in step S82, the contour pixel detection continues until the detected contour pixel corresponds to the start pixel SR.

When no contour pixel is detected ("No" in step S83), the sampling bar TR is rotated one step in a clockwise direction (step S84), and it is judged whether the after rotation position corresponds to any one of the rotation start candidate positions (step S85). Only when the after rotation position corresponds to one of the rotation start candidate positions, the rotation start position is incremented (step S86). Then, the processing is repeated from step S83.

When the detected contour pixel is the start pixel SR ("Yes" in step S87), this means that the sampling bar TS has traced throughout the contour line of the defect candidate region. Therefore, the pixel values of pixels within a region surrounded by the contour pixels detected until then are set to "0" (step S89). Returning to the processing shown in FIG. 16, scanning is resumed in a predetermined direction from the pixel next to the start pixel SR, in order to detect a new start pixel SR (step S72). If no contour pixel is detected even by giving a full rotation (a rotation of 360°) to the sampling bar TR, although not shown in FIG. 17, the pixel value of the start pixel SR is set to "0", then returning to the processing shown in FIG. 16.

The processing in steps S72, S73, and S81 to S89 are repeated until no new start pixel SR is detected ("No" in step S73). In the absence of any new start pixel SR, based on the contour pixel stored in step S88, defect detection is performed (step S74). When the region join processing completes, it returns to the processing of sampling a defect candidate region shown in FIG. 11.

FIGS. 18A and 18B are diagrams to explain the principle of the region join processing in the defect detection apparatus 1. As shown in FIG. 18A, although the case where a plurality of defect candidate regions are gathered should be detected as a defect, the pixel number of each defect candidate region is less than a predetermined threshold value V, the conventional technique has failed to detect it as a defect, causing a miss of defect.

Whereas in the defect detection apparatus I of the first preferred embodiment, the sampling bar TR that is a pixel sequence made of ten pixels disposed to be different direction traces a defect candidate region. Thereby, as shown in FIG. 18B, a plurality of defect candidate regions, the distance between contours of which is not more than a predetermined value (the pixel number LR), can be joined with each other by bridge processing, so that these defect candidate regions are made into a single defect candidate region. In this processing, the purpose of rotating the sampling bar TR by using the individual contour pixels as a fulcrum point pixel OR is to proceed a contour trace while forming a bridge to a contour pixel that is the first encounter in the rotation of the sampling bar TR in the contour pixels (not limiting to the contour pixels constituting the same defect region with the fulcrum point pixel OR) within a predetermined distance from the fulcrum point pixel OR. Further, a similar processing is repeated after moving the sampling bar TR so as to return the rotation position of the sampling bar TR by using the next contour pixel in the detected direction as a fulcrum point pixel OR. This processing is to proceed a contour join through the above-mentioned bridge processing by the oscillation of the sampling bar TR, thereby specifying a new defect candidate region as a closed loop.

The defect candidate region so joined becomes a defect candidate region having a pixel number of not less than the predetermined threshold value V, and it is therefore detectable as a defect. In this case, since the defect is detected after the region join processing, it is also possible to identify this defect candidate region as a defect in the state that defects of below the predetermined value V are gathered. Although in the first preferred embodiment the pixel number LR is set to "10", without limiting to this, any pixel number of "3" or more may be set according to the distance between contours in a defect detected.

Returning to FIG. 11, when the defect detection completes, the defect detecting part 202 generates a defect data 105 based on the detected defect, and terminates the inspection processing, returning to the processing shown in FIG. 3.

The defect data 105 contains (i) the location of a defect that is found by performing the contour sampling processing (FIG. 6) of a defect region, and finding from the centroidal location of a defect based on the contour of the defect; (ii) the size of the defect that is the pixel number contained in the contour of the defect; and (iii) the identifier of a pad having the defect, which is determined depending upon at which contour the centroidal location of the defect is present in the contours of pads indicated in the non-defective contour data 104. For example, the data capturing part 203 displays on the display 24 the defect data 105 so as to be referred when an operator checks the defect.

Returning to FIG. 3, when the inspection processing in step S2 completes, in the defect detection apparatus 1, the unloading mechanism 13 unloads the inspection object substrate 92 held on the inspection stage 12 to the unloader 14a or 14b. At this time, the inspection object substrate 92 in which no defect has been detected by the inspection processing is unloaded to the unloader 14a, and the substrate 92 in which a defect has been detected is unloaded to the unloader 14b.

With this configuration, the defect detection apparatus 1 can classify the inspection object substrate 92 depending on the presence of a defect.

Further, it is judged whether the inspection completes or not, depending on the presence of the inspection object subject 92 on the loader 10 (step S3). When the inspection object substrate 92 to be inspected is present on the loader 10, the processing is repeated from step S2. On the other hand, when the inspection completes by an absence of the inspection object substrate 92 on the loader 10, the processing is terminated.

Thus, in the defect detection apparatus 1 of the first preferred embodiment, an inspecting mask is generated in the following manner that the sampling bar TS made of at least three pixels traces the region of an inspecting pattern in order to smooth the contour of this region. This suppresses a miss of chipping defect while allowing for a misregistration error etc. The concurrent execution of the contour smoothing processing and the processing of sampling the smoothed contour increases the speed of image processing than the case where the two processings are executed separately.

Further, the contour sampling processing is executable at high speed, so that the defect detection processing based on the defect and pattern contour are executed in a practicable processing time.

Furthermore, by virtue of the processing that a plurality of defect candidate regions, the distance between contours of which is not more than a predetermined value, are joined with each other to make them into a single defect candidate region, it is for example possible to prevent a miss of defect in the case where micro defects are gathered. This leads to high-accuracy defect detection.

The first preferred embodiment describes the case that the defect detection apparatus 1 integrally configured performs the entire inspection processing of a pad pattern formed on a substrate. In an alternative, a separate computer may execute the processes except for the image capturing of a non-defective substrate and an inspection object substrate in the inspection process.

Figure 19:
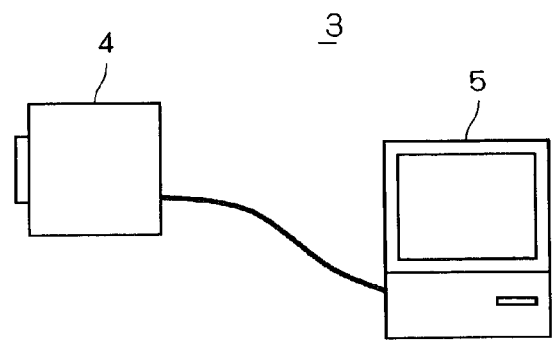
FIG. 19 is a diagram showing a defect detection apparatus according to a second preferred embodiment of the present invention.

FIG. 19 is a diagram showing the configuration of a defect detection system 3 according to a second preferred embodiment based on the above-mentioned principle. The defect detection system 3 has an image capture camera 4 for capturing an image of an object, and a computer 5 for processing the image captured by the camera 4.

The image capture camera 4 captures an image and transfers the obtained image data via a transfer cable to the computer 5. Of course, the image data may be transferred to the computer 5 via a storage medium such as a memory card.

Figure 20:
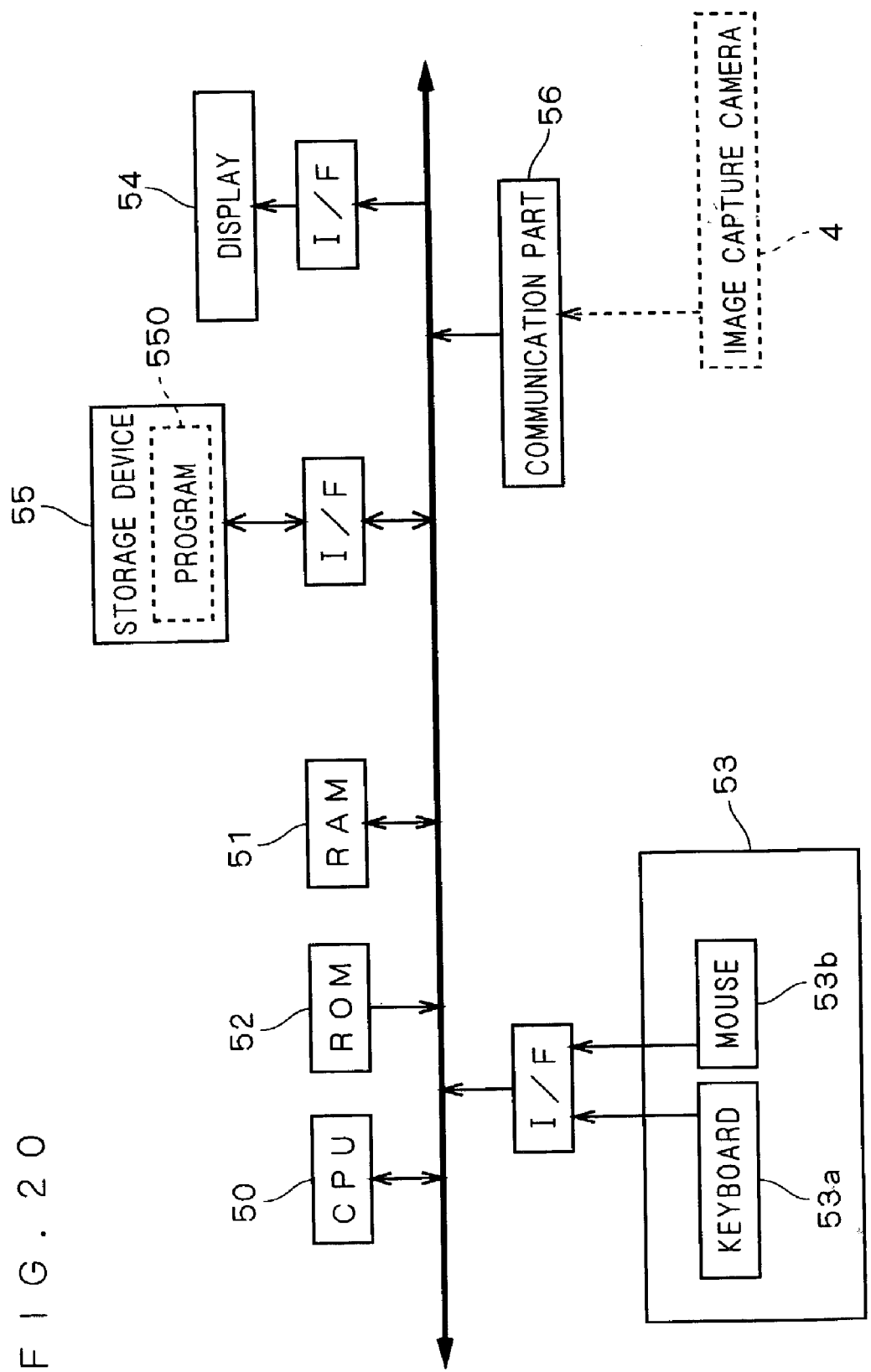
FIG. 20 is a block diagram showing the configuration of a computer in the second preferred embodiment.
Figure 21:
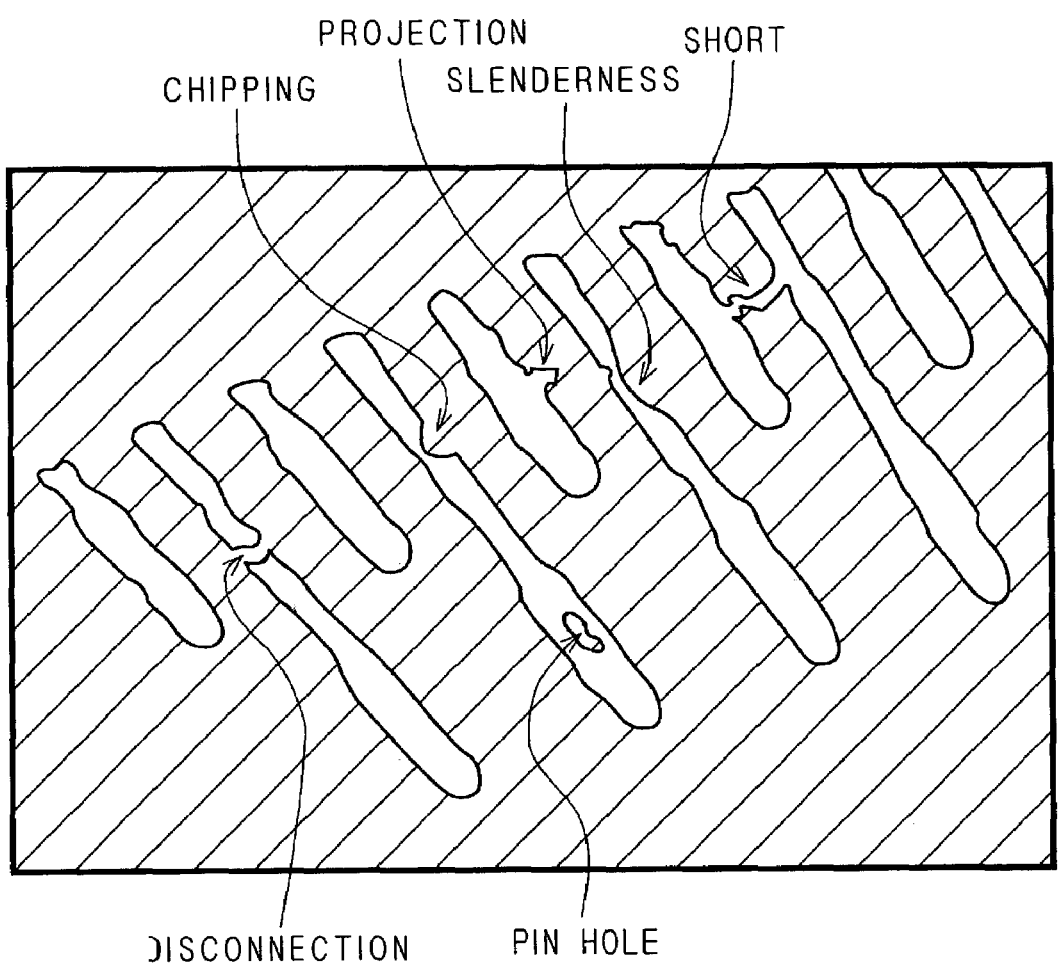
FIG. 21 is a diagram showing an example of defects in a pad pattern.

FIG. 20 is a block diagram showing the configuration of the computer 5. The computer 5 has such a general computer system configuration that a CPU 50 performing a variety of arithmetic operations, a RAM 51 storing a variety of information, and a ROM 52 storing a basic program are connected to a bus line.

In addition, a keyboard 53a and mouse 53b as an operation part 53 receiving the input from an operator, a display 54 displaying a variety of information, a storage device 55 storing data in a storage medium such as a magneto-optical disk, and a communication part 56 making a communication with the image capture camera 4 are connected suitably to the bus line, for example, via an interface (I/F).

A program 550 is previously read from a portable storage medium to the computer 5 via a reading device (not shown), and stored in the storage device 55. Subsequently, the program 550 is copied onto the RAM 51, and the CPU 50 executes arithmetic operation under the program 550 in the RAM 51, so that the computer 5 operates as the control part 2 in the first preferred embodiment.

That is, the defect data 105 is generated, as in the first preferred embodiment, by the configuration that the CPU 50 and its peripheral configuration operate as the reference mask generating part 200, inspecting mask generating part 201, defect detecting part 202, and data capturing part 203, all of which are shown in FIG. 2.

Thus, the same effect as the first preferred embodiment is obtainable with the system configured by the image capture camera 4 and computer 5, as in the defect detection system 3 of the second preferred embodiment.

In the foregoing preferred embodiment, the image processing functions by the CPU are implemented by software processing under the program. In an alternative, part of or all of the functions may be implanted by a dedicated hardware.

Also, the processing for oscillating (rotating) the sampling bar is not limited to the processing described in the foregoing preferred embodiments. For example, the detection of a contour pixel with respect to an inspection object pixel may be started after that the detected contour pixel replaces the fulcrum point pixel and the sampling bar is rotated one step around the new fulcrum point pixel. In so oscillating the sampling bar, the same effect as the foregoing preferred embodiment is also obtainable.

While the invention has been shown and described in detail, the foregoing description is in all aspects illustrative and not restrictive. It is therefore understood that numerous modifications and variations can be devised without departing from the scope of the invention.

What is claimed is:

1. A defect detection apparatus comprising:
   (a) an image capturing part for capturing an image of a substrate;
   (b) a reference mask generating element for generating a reference mask image from an image of a non-defective substrate captured by said image capturing part;
   (c) an inspecting mask generating element for generating an inspecting mask image based on an image of an inspection object substrate captured by said image capturing part and said reference mask image, said inspecting mask generating element comprising:
   (c-1) a smoothing element that traces the contour of a pattern formed on said inspection object substrate ("an inspecting pattern") by using a first contour sampler made of not less than three pixels, and smoothes the contour of said inspecting pattern based on a tracing trajectory in the contour of said inspecting pattern obtained by said first contour sampler;
   (d) a candidate region sampling element for sampling a defect candidate region from said image of said inspection object substrate based on said inspecting mask image; and
   (e) a detecting element for detecting said defect candidate region as a defect of said inspecting pattern based on characteristic features of said defect candidate region,
   whereby detecting a defect of said inspecting pattern formed on said inspection object substrate.

2. The defect detection apparatus according to claim 1 wherein
   said first contour sampler is a pixel sequence made of not less than three pixels disposed to be in different directions, and
   said smoothing element has a first rotation tracing element that detects a direction in which said contour of said inspecting pattern extends by oscillating said first contour sampler, and moves said first contour sampler in the direction so detected.

3. The defect detection apparatus according to claim 2 wherein
   said first rotation tracing element (i) stores, as a candidate position from which said first contour sampler starts rotation, a plurality of first start positions for every predetermined amount of rotation, (ii) starts said rotation from one of said plural first start positions by using one of pixels constituting said first contour sampler as a central pixel ("a first fulcrum point pixel") of said rotation, (iii) detects, as a direction in which said contour of said inspecting pattern extends, a direction in which said first contour sampler extends after said rotation when a pixel other than said first fulcrum point pixel in the pixels constituting said first contour sampler ("a first detection object pixel") matches a pixel constituting said inspecting pattern during the time of said rotation of said first contour sampler, (iv) replaces said central pixel of rotation with said first detection object pixel matched with said pixel constituting said inspecting pattern, and (v) moves said first contour sampler to one of said plurality of first start positions according to said first start position from which said rotation is started and said amount of rotation of said first contour sampler.

4. The defect detection apparatus according to claim 2 wherein
   said first rotation tracing element (i) determines one of pixels constituting said first contour sampler as a central pixel ("a first fulcrum point pixel") of rotation of said first contour sampler and starts said rotation from a predetermined position, (ii) detects, as a direction in which said contour of said inspecting pattern extends, a direction in which said first contour sampler extends after said rotation when a pixel other than said first fulcrum point pixel in the pixels constituting said first contour sampler ("a first detection object pixel") matches a pixel constituting said inspecting pattern during the time of said rotation of said first contour sampler, (iii) replaces said first fulcrum point pixel with said first detection object pixel matched with said pixel constituting said inspecting pattern, and (iv) moves said first contour sampler according to the position of said first contour sampler at the time of the detection of said direction in which the contour of said inspecting pattern extends.

5. The defect detection apparatus according to claim 1 wherein said reference mask generating element comprises:
   (b-1) a contour sampling element for sampling the contour of said non-defective pattern by tracing the contour of a pattern formed on said non-defective substrate ("a non-defective pattern") with the use of a second contour sampler made of not less than two pixels.

6. The defect detection apparatus according to claim 5 wherein
   said second contour sampler is a pixel sequence made of not less than two pixels disposed to be in different directions, and
   said reference mask generating element further comprises:
   (b-2) a second rotation tracing element that detects a direction in which the contour of said non-defective pattern extends by oscillating said second contour sampler and moves said second contour sampler to said direction detected.

7. The defect detection apparatus according to claim 6 wherein
   said second rotation tracing element (i) stores, as a candidate position from which said second contour sampler starts rotation, a plurality of second start positions for every predetermined amount of rotation, (ii) starts said rotation from one of said plural second start positions by using one of pixels constituting said second contour sampler as a central pixel ("a second fulcrum point pixel") of said rotation, (iii) detects, as a direction in which said contour of said non-defective pattern extends, a direction in which said second contour sampler extends after said rotation when a pixel other than said second fulcrum point pixel in the pixels constituting said second contour sampler ("a second detection object pixel") matches a pixel constituting said non-defective pattern during the time of said rotation of said second contour sampler, (iv) replaces said central pixel of rotation with said second detection object pixel matched with said pixel constituting said non-defective pattern, and (v) moves said second contour sampler to one of said plurality of second start positions according to said second position from which said rotation is started and said amount of rotation of said second contour sampler.

8. The defect detection apparatus according to claim 6 wherein
   said second rotation tracing element (i) determines one of pixels constituting said second contour sampler as a central pixel ("a second fulcrum point pixel") of rotation of said second contour sampler and starts said rotation from a predetermined position, (ii) detects, as a direction in which said contour of said non-defective pattern extends, a direction in which said second contour sampler extends after said rotation when a pixel other than said second fulcrum point pixel in the pixels constituting said second contour sampler ("a second detection object pixel") matches a pixel constituting said non-defective pattern during the time of said rotation of said second contour sampler, (iii) replaces said second fulcrum point pixel with said second detection object pixel matched with said pixel constituting said non-defective pattern, and (iv) moves said second contour sampler according to the position of said second contour sampler at the time of the detection of said direction in which the contour of said inspecting pattern extends.

9. The defect detection apparatus according to claim 5 wherein
   said detecting element classifies said defect candidate region based on said contour of said non-defective pattern and detects said defect candidate region as a defect of said inspecting pattern based on the result of said classification.

10. The defect detection apparatus according to claim 1 wherein
   said detecting element comprises:
   (e-1) joining element for joining a plurality of defect candidate regions, the distance between contours of which is not more than a predetermined value, in order to make them into a single defect candidate region.

11. The defect detection apparatus according to claim 10 wherein
   said joining element joins said plurality of defect candidate regions by oscillating a third contour sampler made of a pixel sequence made of not less than three pixels disposed to be in different directions, so as to bridge between contour lines of said plurality of defect candidate regions.

12. The defect detection apparatus according to claim 11 wherein
   said joining element (i) stores, as a candidate position from which said third contour sampler starts rotation, a plurality of third start positions for every predetermined amount of rotation, (ii) starts with said rotation from one of said plural third start positions by using one of pixels constituting said third contour sampler as a central pixel ("a third fulcrum point pixel") of said rotation, (iii) bridges, when a pixel other than said third fulcrum point pixel in the pixels constituting said third contour sampler ("a third detection object pixel") matches a pixel ("defect pixel") constituting one of said plurality of defect candidate regions during the time of said rotation of said third contour sampler, between contour lines of a defect candidate region containing said third detection object pixel matched with said defect pixel and a defect candidate region containing said third fulcrum point pixel, (iv) replaces said third fulcrum point pixel with said third detection object pixel matched with said defect pixel, and (v) moves with said third contour sampler to one of said plurality of third start positions according to said third position from which said rotation is started and said amount of rotation of said third contour sampler, whereby joining said plurality of defect candidate regions while tracing said contour lines.

13. The defect detection apparatus according to claim 11 wherein
   said joining element (i) determines one of pixels constituting said third contour sampler as a central pixel ("a third fulcrum point pixel") of rotation of said third contour sampler and starts said rotation from a predetermined position, (ii) bridges, when a pixel other than said third fulcrum point pixel in the pixels constituting said third contour sampler ("a third detection object pixel") matches a pixel ("defect pixel") constituting one of said plurality of defect candidate regions during the time of said rotation of said third contour sampler, between contour lines of a defect candidate region containing said third detection object pixel matched with said defect pixel and a defect candidate region containing said third fulcrum point pixel, (iv) replaces said third fulcrum point pixel with said third detection object pixel matches with said defect pixel, and (v)

moves said third contour sampler according to the position of said third contour sampler at the time of the bridging between said contour lines, whereby joining said plurality of defect candidate regions while tracing said contour lines.

14. A method of detecting a defect comprising:
(a) an image capturing step of capturing an image of a substrate;
(b) a reference mask generating step of generating a reference mask image from an image of a non-defective substrate captured in said image capturing step;
(c) an inspecting mask generating step of generating an inspecting mask image based on an image of an inspection object substrate captured in said image capturing step and said reference mask image, said inspecting mask generating step comprising the step of:
(c-1) a step of tracing the contour of a pattern ("an inspecting pattern") formed on said inspection object substrate by using a first contour sampler made of not less than three pixels, and smoothing the contour of said inspecting pattern based on a tracing trajectory in said contour of said inspecting pattern obtained by said first contour sampler;
(d) a defect candidate sampling step of sampling a defect candidate region from said image of said inspection object substrate based on said inspecting mask image; and
(e) a detection step of detecting said defect candidate region as a defect of said pattern based on characteristic features of said defect candidate region;
whereby detecting a defect of said pattern formed on said inspection object substrate.

15. The method according to claim 14 wherein
said reference mask generating step samples the contour of said non-defective pattern by tracing the contour of a pattern ("a non-defective pattern") formed on said non-defective substrate with the use of a second contour sampler made of not less than two pixels.

16. The method according to claim 14 wherein
said detecting step joins a plurality of defect candidate regions, the distance between contours of which is not more than a predetermined value, in order to make them into a single defect candidate region.

17. A program stored on a computer readable medium causing a computer to execute the followings:
(a) an image capturing step of capturing an image of a substrate;
(b) a reference mask generating step of generating a reference mask image from an image of non-defective substrate captured in said image capturing step;
(c) an inspecting mask generating step of generating an inspecting mask image based on an image of an inspection object substrate captured in said image capturing step and said reference mask image, said inspecting mask generating step comprising the step of:
(c-1) a step of tracing the contour of a pattern ("an inspecting pattern") formed on said inspection object substrate by using a first contour sampler made of not less than three pixels, and smoothing the contour of said inspecting pattern based on a tracing trajectory in said contour of said inspecting pattern obtained by said first contour sampler;
(d) a defect candidate sampling step of sampling a defect candidate region from said image of said inspection object substrate based on said inspecting mask image; and
(e) a detection step of detection said defect candidate region as a defect of said pattern based on characteristic features of said defect candidate region.

18. The computer readable medium according to claim 17 wherein
said reference mask generating step samples the contour of said non-defective pattern by tracing the contour of a pattern ("a non-defective pattern") formed on said non-defective substrate with the use of a second contour sampler made of not less than two pixels.

19. The computer readable medium according to claim 17 wherein
said detecting step joins a plurality of defect candidate regions, the distance between contours of which is not more than a predetermined value, in order to make them into a single defect candidate region.

* * * * *